(12) United States Patent
Rodriguez

(10) Patent No.: US 8,600,217 B2
(45) Date of Patent: Dec. 3, 2013

(54) SYSTEM AND METHOD FOR IMPROVING QUALITY OF DISPLAYED PICTURE DURING TRICK MODES

(76) Inventor: Arturo A. Rodriguez, Norcross, GA (US)

(*) Notice: Subject to any disclaimer, the term of this patent is extended or adjusted under 35 U.S.C. 154(b) by 1926 days.

(21) Appl. No.: 10/891,318

(22) Filed: Jul. 14, 2004

(65) Prior Publication Data

US 2006/0013568 A1     Jan. 19, 2006

(51) Int. Cl.
*H04N 9/80* (2006.01)
*H04N 5/765* (2006.01)
*H04N 5/783* (2006.01)

(52) U.S. Cl.
USPC ............ 386/248; 386/232; 386/239; 386/343

(58) Field of Classification Search
USPC ................ 386/68, 83, 95, 110, 131, 231, 386/343–352, 232, 239–248
See application file for complete search history.

(56) References Cited

U.S. PATENT DOCUMENTS

| | | | |
|---|---|---|---|
| 4,216,504 A | 8/1980 | Boussina et al. | |
| 4,504,852 A * | 3/1985 | Ducret | 348/458 |
| 4,881,125 A | 11/1989 | Krause | |
| 4,972,274 A * | 11/1990 | Becker et al. | 386/281 |
| 5,187,575 A | 2/1993 | Lim | 358/140 |
| 5,218,435 A | 6/1993 | Lim et al. | 358/133 |
| 5,262,854 A | 11/1993 | Ng | |
| 5,329,309 A | 7/1994 | Dorricott et al. | |
| 5,329,409 A | 7/1994 | Hampshire | 360/77.02 |
| 5,377,051 A | 12/1994 | Lane et al. | |
| 5,426,464 A | 6/1995 | Casavant et al. | |
| 5,444,491 A | 8/1995 | Lim | 348/441 |
| 5,459,528 A | 10/1995 | Pettitt | |
| 5,485,210 A | 1/1996 | Lim et al. | 348/409 |
| 5,606,359 A | 2/1997 | Youden et al. | |
| 5,614,952 A | 3/1997 | Boyce et al. | |
| 5,646,693 A | 7/1997 | Cismas | |
| 5,703,966 A | 12/1997 | Astle | |
| 5,724,446 A | 3/1998 | Liu et al. | |
| 5,742,829 A | 4/1998 | Davis et al. | |
| 5,748,789 A | 5/1998 | Lee et al. | |
| 5,764,992 A | 6/1998 | Kullick et al. | |
| 5,812,787 A | 9/1998 | Astle | |
| 5,828,370 A | 10/1998 | Moeller et al. | |

(Continued)

FOREIGN PATENT DOCUMENTS

| EP | 0 595 323 A2 | 5/1994 |
|---|---|---|
| EP | 0812112 A2 | 12/1997 |

(Continued)

OTHER PUBLICATIONS

Canadian Office Action cited in Application No. 2,472,244 mailed Apr. 3, 2008.

(Continued)

*Primary Examiner* — Hung Dang
(74) *Attorney, Agent, or Firm* — Merchant & Gould

(57) ABSTRACT

A video decompression system and method are disclosed. In one preferred embodiment, the video decompression system comprises a memory with logic, and a processor configured with the logic to receive a compressed video stream that includes frame pictures and detect a scan mode indicator in the compressed video stream, wherein the scan mode indicator indicates whether a progressive scan format was used during the creation of the frame pictures.

22 Claims, 8 Drawing Sheets

(56) References Cited

U.S. PATENT DOCUMENTS

| | | | |
|---|---|---|---|
| 5,835,149 A | 11/1998 | Astle | |
| 5,835,151 A | 11/1998 | Sun et al. | |
| 5,836,003 A | 11/1998 | Sadeh | |
| 5,841,480 A * | 11/1998 | Rhodes | 348/459 |
| 5,844,620 A | 12/1998 | Coleman et al. | |
| 5,929,911 A | 7/1999 | Cheney et al. | |
| 5,930,445 A * | 7/1999 | Peters et al. | 386/290 |
| 5,953,506 A | 9/1999 | Kalra et al. | |
| 5,956,026 A | 9/1999 | Ratakonda | |
| 5,959,684 A | 9/1999 | Tan et al. | |
| 5,982,360 A | 11/1999 | Wu et al. | |
| 5,995,095 A | 11/1999 | Ratakonda | |
| 6,006,034 A | 12/1999 | Heath et al. | |
| 6,009,231 A | 12/1999 | Aoki et al. | |
| 6,043,838 A | 3/2000 | Chen | |
| 6,072,531 A * | 6/2000 | Shibano | 348/448 |
| 6,072,532 A * | 6/2000 | Chieh et al. | 348/478 |
| 6,084,908 A | 7/2000 | Chiang et al. | |
| 6,137,948 A * | 10/2000 | Moon et al. | 386/68 |
| 6,148,027 A | 11/2000 | Song et al. | |
| 6,157,396 A | 12/2000 | Margulis et al. | |
| 6,201,927 B1 * | 3/2001 | Comer | 386/68 |
| 6,208,692 B1 | 3/2001 | Song et al. | |
| 6,222,979 B1 | 4/2001 | Willis et al. | |
| 6,233,253 B1 | 5/2001 | Settle et al. | |
| 6,326,964 B1 | 12/2001 | Snyder et al. | |
| 6,353,633 B1 | 3/2002 | Her | |
| 6,360,015 B1 | 3/2002 | Bakhmutsky et al. | |
| 6,400,764 B1 | 6/2002 | Bakhmutsky | |
| 6,408,101 B1 | 6/2002 | Krishnamurthy et al. | |
| 6,414,991 B1 | 7/2002 | Yagasaki et al. | |
| 6,430,317 B1 | 8/2002 | Krishnamurthy et al. | |
| 6,434,196 B1 | 8/2002 | Sethuraman et al. | |
| 6,434,197 B1 | 8/2002 | Wang et al. | |
| 6,438,168 B2 | 8/2002 | Arye | |
| 6,441,754 B1 | 8/2002 | Wang et al. | |
| 6,477,562 B2 | 11/2002 | Nemirovsky et al. | |
| 6,532,593 B1 | 3/2003 | Moroney | |
| 6,535,559 B2 | 3/2003 | Yagasaki et al. | |
| 6,560,371 B1 | 5/2003 | Song et al. | |
| 6,570,579 B1 | 5/2003 | MacInnis et al. | |
| 6,608,625 B1 | 8/2003 | Chin et al. | |
| 6,618,507 B1 | 9/2003 | Divakaran et al. | |
| 6,643,328 B2 | 11/2003 | Yagasaki et al. | |
| 6,654,539 B1 * | 11/2003 | Duruoz et al. | 386/68 |
| 6,658,157 B1 | 12/2003 | Satoh et al. | |
| 6,658,199 B1 | 12/2003 | Hallberg | |
| 6,671,322 B2 | 12/2003 | Vetro et al. | |
| 6,671,454 B1 | 12/2003 | Kaneko et al. | |
| 6,690,881 B1 * | 2/2004 | Tomita et al. | 386/117 |
| 6,700,622 B2 * | 3/2004 | Adams et al. | 348/448 |
| 6,735,253 B1 | 5/2004 | Chang et al. | |
| 6,766,407 B1 | 7/2004 | Lisitsa et al. | |
| 6,768,774 B1 | 7/2004 | MacInnis et al. | |
| 6,847,778 B1 | 1/2005 | Vallone et al. | |
| 6,871,003 B1 * | 3/2005 | Phillips et al. | 386/281 |
| 6,876,703 B2 | 4/2005 | Ismaeil et al. | |
| 6,909,749 B2 | 6/2005 | Yang et al. | |
| 6,931,064 B2 | 8/2005 | Mori et al. | |
| 6,996,838 B2 | 2/2006 | Rodriguez | |
| 7,010,040 B2 | 3/2006 | Kim | |
| 7,027,713 B1 | 4/2006 | Hallberg | |
| 7,050,499 B2 | 5/2006 | Kodama et al. | |
| 7,079,578 B2 | 7/2006 | Segev | |
| 7,154,560 B1 | 12/2006 | Chang et al. | |
| 7,233,622 B2 | 6/2007 | Winger et al. | |
| 7,274,857 B2 | 9/2007 | Nallur et al. | |
| 7,302,002 B2 | 11/2007 | Yagasaki et al. | |
| 7,324,595 B2 | 1/2008 | Cote et al. | |
| 7,327,786 B2 | 2/2008 | Winger et al. | |
| 7,356,082 B1 | 4/2008 | Kuhn | |
| 7,391,809 B2 | 6/2008 | Li et al. | |
| 7,418,037 B1 | 8/2008 | Nie et al. | |
| 7,477,833 B2 | 1/2009 | Kato et al. | |
| 7,869,505 B2 | 1/2011 | Rodriguez et al. | |
| 7,966,642 B2 | 6/2011 | Nair et al. | |
| 2001/0014206 A1 | 8/2001 | Artigalas et al. | |
| 2002/0009149 A1 | 1/2002 | Rodriguez et al. | |
| 2002/0039483 A1 | 4/2002 | Frost et al. | |
| 2002/0044762 A1 | 4/2002 | Wood et al. | |
| 2002/0071663 A1 | 6/2002 | O'Donnel | |
| 2002/0157112 A1 | 10/2002 | Kuhn | |
| 2002/0199199 A1 | 12/2002 | Rodriguez | 725/95 |
| 2003/0001964 A1 | 1/2003 | Masukura et al. | |
| 2003/0066084 A1 | 4/2003 | Kaars | |
| 2003/0078061 A1 | 4/2003 | Kim | |
| 2003/0093800 A1 | 5/2003 | Demas et al. | |
| 2003/0098924 A1 | 5/2003 | Adams et al. | |
| 2003/0103604 A1 * | 6/2003 | Kato et al. | 379/68 |
| 2003/0113098 A1 | 6/2003 | Willis | |
| 2003/0123849 A1 | 7/2003 | Nallur et al. | 386/68 |
| 2003/0147631 A1 | 8/2003 | Zimmermann | |
| 2003/0170003 A1 | 9/2003 | Levesque et al. | |
| 2003/0233663 A1 | 12/2003 | Rao et al. | |
| 2004/0055020 A1 | 3/2004 | Delpuch | |
| 2004/0062313 A1 | 4/2004 | Schoenblum | |
| 2004/0194134 A1 | 9/2004 | Gunatilake et al. | |
| 2004/0218680 A1 | 11/2004 | Rodriguez et al. | |
| 2005/0022245 A1 | 1/2005 | Nallur et al. | |
| 2005/0074063 A1 | 4/2005 | Nair et al. | |
| 2006/0093320 A1 | 5/2006 | Hallberg et al. | |
| 2007/0286581 A1 | 12/2007 | Boston et al. | |
| 2008/0031337 A1 | 2/2008 | Hasegawa et al. | |
| 2008/0037952 A1 | 2/2008 | Nallur et al. | |
| 2008/0037957 A1 | 2/2008 | Nallur et al. | |
| 2008/0253464 A1 | 10/2008 | Rodriguez et al. | |
| 2008/0260024 A1 | 10/2008 | Chen et al. | |
| 2008/0279284 A1 | 11/2008 | Rodriguez et al. | |
| 2009/0033791 A1 | 2/2009 | Rodriguez et al. | |
| 2010/0020878 A1 | 1/2010 | Liang | |

FOREIGN PATENT DOCUMENTS

| | | |
|---|---|---|
| EP | 1 026 899 A1 | 8/2000 |
| EP | 1 161 089 A2 | 12/2001 |
| EP | 1 195 995 A2 | 4/2002 |
| JP | 5-49000 | 2/1993 |
| JP | 10-243344 | 10/1998 |
| JP | 10-271498 | 10/1998 |
| JP | 11-18063 | 1/1999 |
| JP | 11-196411 | 7/1999 |
| JP | 2002-500851 | 1/2002 |
| JP | 2003-87785 | 3/2003 |
| JP | 2003-102008 | 3/2003 |
| WO | WO 96/10889 | 4/1996 |
| WO | WO 97/15149 | 4/1997 |
| WO | 99/14940 A1 | 3/1999 |
| WO | WO 99/12097 | 3/1999 |
| WO | WO 99/22517 | 5/1999 |
| WO | 99/59343 A | 11/1999 |
| WO | WO 01/13625 A1 | 2/2001 |
| WO | WO 02/43385 A2 | 5/2002 |

OTHER PUBLICATIONS

Canadian Office Action cited in Application No. 2,573,906 mailed Apr. 1, 2009.

EP Communication Pursuant to Article 94(3) EPC cited in 00 984 341.8 mailed May 19, 2009.

EP Communication Pursuant to Article 94(3) EPC cited in 02 794 331.5 mailed Jan. 12, 2009.

International Search Report cited in PCT/US00/33837 mailed Mar. 1, 2001.

International Search Report cited in PCT/US02/40828 mailed Apr. 21, 2003.

International Search Report and Written Opinion cited in PCT/US2004/030012 mailed Dec. 27, 2004.

International Search Report and Written Opinion cited in PCT/US2005/024706 mailed Oct. 18, 2005.

International Search Report and Written Opinion cited in PCT/US2008/070856 mailed Dec. 15, 2008.

Japanese Office Action cited in 2001-546180 mailed Mar. 30, 2007.

(56) References Cited

OTHER PUBLICATIONS

Japanese Office Action cited in 2001-546180 mailed Jun. 9, 2008.
Japanese Final Office Action cited in 2001-546180 mailed Jun. 18, 2009.
Richardson, I. et al., "Video codec complexity management," *Proc. International Picture Coding Symposium (PCS01)*, Seoul, Korea, 4 pages (Apr. 2001).
Topiwala, P., "Status of the emerging ITU-T/H.264 | ISO/MPEG-4, Part 10 Video coding standard," *Proceedings of SPIE*, vol. 4790, pp. 261-277 (Jul. 8, 2002).
Written Opinion cited in PCT/US00/33837 mailed Dec. 27, 2001.
Written Opinion cited in PCT/US02/40828 mailed Dec. 16, 2003.
U.S. Non-Final Office Action cited in U.S. Appl. No. 09/736,661 mailed Aug. 24, 2001.
U.S. Final Office Action cited in U.S. Appl. No. 09/736,661 mailed Apr. 10, 2002.
U.S. Non-Final Office Action cited in U.S. Appl. No. 09/736,661 mailed Mar. 26, 2003.
U.S. Non-Final Office Action cited in U.S. Appl. No. 09/736,661 mailed Oct. 20, 2003.
U.S. Non-Final Office Action cited in U.S. Appl. No. 09/736,661 mailed Jul. 19, 2004.
U.S. Final Office Action cited in U.S. Appl. No. 09/736,661 mailed Sep. 22, 2005.
U.S. Non-Final Office Action cited in U.S. Appl. No. 09/736,661 mailed Jul. 17, 2006.
U.S. Final Office Action cited in U.S. Appl. No. 09/736,661 mailed Jan. 3, 2007.
U.S. Non-Final Office Action cited in U.S. Appl. No. 09/736,661 mailed Sep. 11, 2007.
U.S. Final Office Action cited in U.S. Appl. No. 09/736,661 mailed Apr. 11, 2008.
U.S. Non-Final Office Action cited in U.S. Appl. No. 09/736,661 mailed Jul. 29, 2008.
U.S. Non-Final Office Action cited in U.S. Appl. No. 09/736,661 mailed Mar. 3, 2009.
U.S. Non-Final Office Action cited in U.S. Appl. No. 09/736,661 mailed Sep. 16, 2009.
U.S. Non-Final Office Action cited in U.S. Appl. No. 10/663,037 mailed Dec. 10, 2007.
U.S. Non-Final Office Action cited in U.S. Appl. No. 10/663,037 mailed Jun. 27, 2008.
U.S. Final Office Action cited in U.S. Appl. No. 10/663,037 mailed Dec. 10, 2008.
U.S. Non-Final Office Action cited in U.S. Appl. No. 10/663,037 mailed May 14, 2009.
U.S. Non-Final Office Action cited in U.S. Appl. No. 10/854,874 mailed May 13, 2008.
U.S. Non-Final Office Action cited in U.S. Appl. No. 10/854,874 mailed Dec. 15, 2008.
U.S. Final Office Action cited in U.S. Appl. No. 10/854,874 mailed Jun. 11, 2009.
U.S. Appl. No. 12/180,501, filed Jul. 25, 2008, entitled "Transcoding for Systems Operating Under Plural Video Coding Specifications," Inventors: Liang et al.
Japanese Final Office Action cited in 2006-526399 mailed Sep. 29, 2009.
EP Examination cited in 08 150 948.1 mailed Dec. 17, 2010.
Simonson et al., "Version augmented URIs for reference permanencevia an Apache module design," Computer Networks and ISDN Systems, North Holland Publishing, Amsterdam, NL, vol. 30, Apr. 1-7, 1998, pp. 337-345.
Canadian Office Action cited in Application No. 2,573,906 mailed Aug. 9, 2010.
International Preliminary Report on Patentability and Written Opinion cited in PCT/US2008/070856 mailed Feb. 2, 2010.
EP Examination cited in 00 984 341.8 mailed Dec. 14, 2009.
U.S. Final Office Action cited in U.S. Appl. No. 10/663,037 mailed Nov. 24, 2009.
U.S. Final Office Action cited in U.S. Appl. No. 09/736,661 mailed Mar. 9, 2010.
Canadian Office Action cited in Application No. 2,539,120 mailed Mar. 9, 2010.
EP Examination cited in 05 764 529.3 mailed Jun. 18, 2010.
U.S. Final Office Action cited in U.S. Appl. No. 10/623,683 mailed Jul. 25, 2008.
U.S. Non-Final Office Action cited in U.S. Appl. No. 10/623,683 mailed Dec. 28, 2007.
Canadian Office Action cited in Application No. 2,573,906 mailed Apr. 7, 2011.
Canadian Office Action cited in Application No. 2,539,120 mailed Jun. 2, 2011, 3 pages.
European Search Report mailed Aug. 1, 2011 in Application 11166809.1, 7 pages.
European Communication dated Aug. 5, 2011 in Application No. 08 796 477.1, 11 pages.
European Summons to attend oral proceedings dated Nov. 11, 2011 in Application No. 04757143.5, 5 pages.
Canadian Office Action mailed Feb. 17, 2012 in Application No. 2,539,120, 4 pages.
Canadian Office Action mailed Mar. 9, 2012 in Application No. 2,573,906, 6 pages.
European Communication dated Apr. 3, 2012 in Application No. 11 166 809.1, 5 pages.
European Communication dated Apr. 27, 2012 in Application No. 04788743.5, 6 pages.
U.S. Non-Final Office Action mailed Aug. 22, 2011 in U.S. Appl. No. 12/177,916, 35 pages.
U.S. Non-Final Office Action mailed Sep. 16, 2011 in U.S. Appl. No. 12/180,501, 29 pages.
U.S. Non-Final Office Action mailed Oct. 11, 2011 in U.S. Appl. No. 11/831,928, 11 pages.
U.S. Final Office Action mailed Jan. 13, 2012 in U.S. Appl. No. 12/177,916, 7 pages.
U.S. Final Office Action mailed Mar. 5, 2012 in U.S. Appl. No. 12/180,501, 9 pages.
U.S. Non-Final Office Action mailed Mar. 29, 2012 in U.S. Appl. No. 11/832,391, 25 pages.
U.S. Non-Final Office Action mailed Apr. 10, 2012 in U.S. Appl. No. 11/843,711, 22 pages.
U.S. Final Office Action mailed May 22, 2012 in U.S. Appl. No. 11/831,928, 12 pages.

* cited by examiner

SYSTEM AND METHOD FOR IMPROVING QUALITY OF DISPLAYED PICTURE DURING TRICK MODES

TECHNICAL FIELD

The present disclosure is generally related to playback modes, and more particularly related to playback modes for compressed video streams.

BACKGROUND OF THE INVENTION

Digital video compression methods work by exploiting data redundancy in a video sequence (i.e., a sequence of digitized pictures). There are two types of redundancies exploited in a video sequence, namely, spatial and temporal, as is the case in existing video coding standards. A description of one of these standards can be found in the following publication, which is hereby incorporated herein by reference: ISO/IEC International Standard IS 11172-2, "Information technology—Coding of moving pictures and associated audio for digital storage media at up to about 1.5 Mbits/s—Part 2: video," 1993.

Compressed video streams typically include independent and dependent pictures. An independent picture is coded using information only from itself whereas a dependent picture is coded using information from one or more other pictures. An example of an independent picture is an Intracoded picture, often referred to as an I-frame. I-frames are typically compressed by exploiting the internal spatial redundancy of rectangular (or square) regions independently of reference pictures, or by predicting the information within a rectangular region from the decompressed representation of other rectangular regions in the picture that have undergone compression. The first picture of a compressed video sequence is typically, but not necessarily, an I-frame. Examples of dependent frames are predictive pictures (also known as P-frames), and bi-directional pictures (also known as B-frames). P-frames are pictures in which each of its rectangular regions can be compressed by predicting their value from the decompressed representation of any one of possibly several reference pictures. A past reference picture is a picture that is to be displayed prior to the current picture. B-frames are pictures in which rectangular regions can be compressed by predicting their value from any two reference pictures such as a past reference picture and a future reference picture. A future reference picture is a picture that is to be displayed after the current picture.

A compressed sequence of pictures results in a video bitstream, also called a compressed video stream, that can be decompressed to provide any playback mode, including trick modes such as fast-forward playback and reverse playback viewing of a television program or movie. Often during trick modes, pictures are displayed multiple times consecutively to effect the instantiation of the trick mode. However, a television picture scan format at its time of creation coupled with compression schemes that encode pictures or parts thereof in one or more different scan formats exhibit compounded artifacts when the pictures are displayed. For example, a slow forward or slow reverse operation may require a picture to be displayed repeatedly over multiple consecutive "picture display" intervals. In the case of interlaced video captured by a camera at every field interval, such as $\frac{1}{60}^{th}$ of a second apart, if both fields of the picture are displayed repeatedly in their intended order over multiple consecutive picture display intervals in an interlaced display, motion jitter may be exhibited during the displayed instance of the video in the slow forward or slow reverse operation. This is exacerbated in high motion video sequences. The problem is also manifested in some fast playback operations. Similarly, displaying the same two fields in a progressive display repeatedly over multiple consecutive picture display intervals may exhibit discontinuities in the contours of objects as a result of the displacement caused by the motion. Some decoding and/or display methods address these problems by providing only one field of the picture twice or scaling the field by two in the vertical orientation, often at the expense of picture quality. Therefore, there exists a need for systems and methods that address at least some of the aforementioned and/or other deficiencies and/or inadequacies.

BRIEF DESCRIPTION OF THE DRAWINGS

The preferred embodiments of the disclosure can be better understood with reference to the following drawings. The components in the drawings are not necessarily to scale, emphasis instead being placed upon clearly illustrating the disclosed principles. Moreover, in the drawings, like reference numerals designate corresponding parts throughout the several views.

DETAILED DESCRIPTION OF THE PREFERRED EMBODIMENTS

Figure 1:
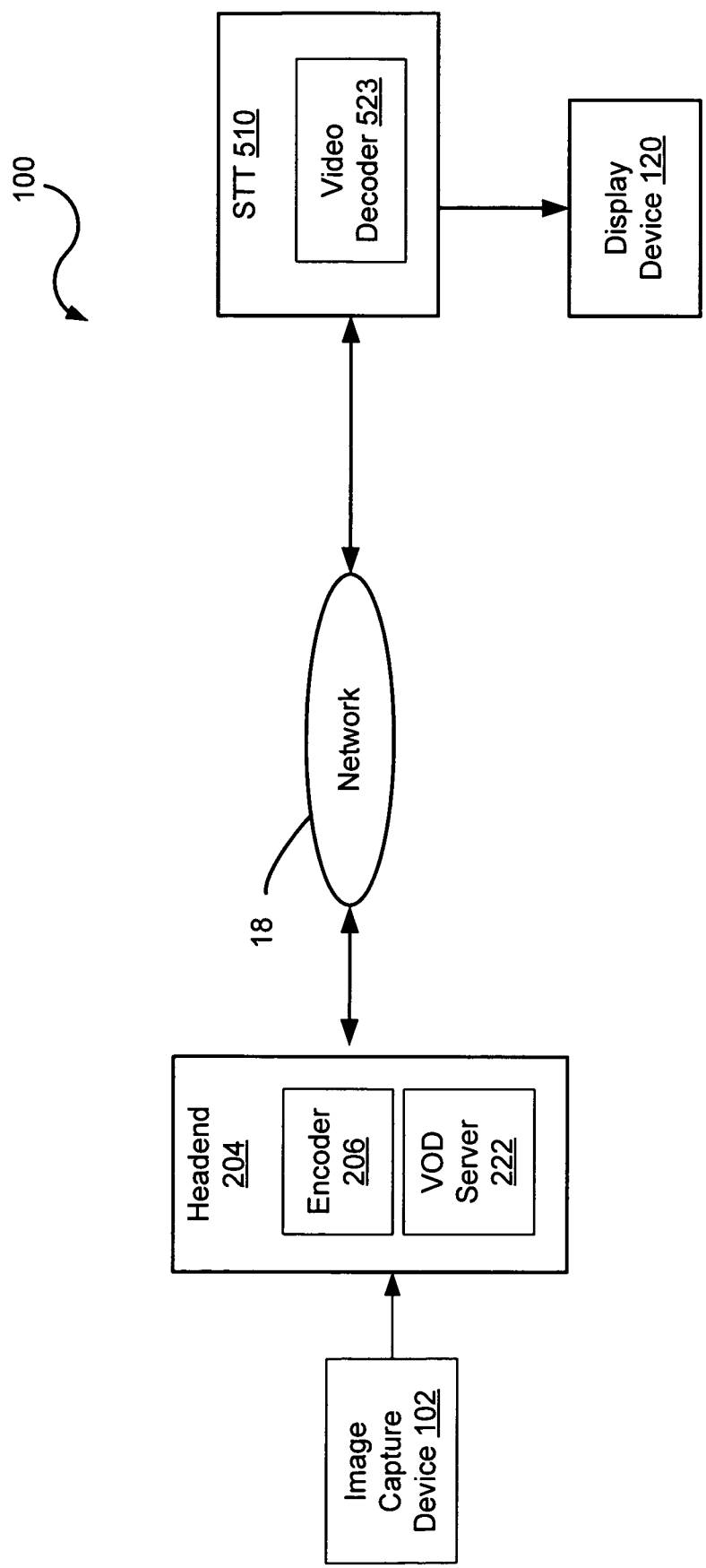
FIG. 1 is a block diagram of an example subscriber television system, in accordance with one preferred embodiment of the disclosure.

Preferred embodiments of this disclosure now will be described more fully hereinafter with reference to the accompanying drawings. The preferred embodiments will herein be described in the context of a set top terminal (STT) that receives a compressed video stream over a subscriber television system network and stores the pictures of the associated compressed video stream in a coupled storage device for later retrieval to provide any of a plurality of viewing modes, including normal playback and trick mode viewing. In addition, the STT described herein is capable of a video-on-demand (VOD) service wherein a video program or movie, or any portion thereof can be received from a device, such as a server located remotely in a television network, for a period of time in any of several playback modes, including normal playback (e.g., regular viewing playback such as by selecting "Play" on a remote control device) and playback modes for trick mode viewing. Trick mode viewing functionality includes operations that provide decoded pictures to a display device in one of several playback modes, including fast forward, slow forward, rewind, slow backward, and pause, and derivatives thereof. A playback mode instantiation is the display that results from providing the decoded pictures in one of these playback modes.

The preferred embodiments of the disclosure include systems and methods for detecting a picture's scan format at the time of picture creation, including if it was a picture sourced from film or a progressive scan source, and responsively providing a playback of pictures during trick mode display that comprises the decoded top and bottom fields of the picture when outputting to a display device (e.g., an interlaced display device), as opposed to providing one of the fields twice or scaling up only one of the fields. During playback modes that require that each of one or more pictures be displayed repeatedly over multiple consecutive picture display intervals, a video decoder implemented according to the preferred embodiments of the disclosure will cause the display of both fields without artifacts, such as motion jitter or discontinuous objects, rather than one vertical upscaled field of the picture, resulting in higher picture quality, among other benefits.

Preferably, the video decoder, in accordance with one preferred embodiment, inspects a flag in the picture header or sequence header of a compressed video stream to determine whether the video is film, its scan format at its time of creation, and the scan format employed during compression. One such flag included in the picture header or sequence header, or in an auxiliary file of annotations, is referred to herein as a scan mode flag and specifies that a picture or sequence of pictures, respectively, correspond to a progressive scan source at picture creation time.

In the description that follows, an example subscriber television network and headend will be described that receives pictures from an image capture device, encodes the pictures, and transmits the encoded pictures to one or more STTs. At the STT, the pictures are preferably decoded and then provided to a display device. The various scan formats that can be implemented throughout the capture and delivery of the pictures is described, along with a description of an example compressed video (e.g., MPEG) stream packet that includes a different scan mode flag. Further, an example STT is described that provides a detailed description of the decoding operations, followed by a discussion of the preferred embodiments in the context of playback mode display strategies and 3:2 pulldown.

The preferred embodiments of the disclosure may, however, be embodied in many different forms and should not be construed as limited to the embodiments set forth herein. Rather, these embodiments are provided so that this disclosure will be thorough and complete, and will fully convey the scope of the disclosure to those having ordinary skill in the art. Furthermore, all "examples" given herein are intended to be non-limiting, and are included as examples among many others contemplated and within the scope of the preferred embodiments of the disclosure.

Subscriber Television System

FIG. 1 is a block diagram depicting an example subscriber television system (STS) 100, in accordance with one preferred embodiment of the disclosure. In this example, the STS 100 includes a headend 204 and a set top terminal (STT) 510 that are coupled via a network 18. The headend 204 and the STT 510 cooperate to provide a user with television functionality including, for example, television programs, an interactive program guide (IPG), and/or video-on-demand (VOD), with support for normal playback modes and playback modes that correspond to trick modes, among other functionality. The headend 204 may include one or more server devices for providing video, audio, and/or textual data to one or more STTs 510, such as a VOD server 222. In one preferred embodiment, the headend 204 includes one or more encoders 206. The encoder 206 receives pictures from an image capture device 102 (e.g., a camera, optical scanner, etc.) or a repository device containing digitized pictures and encodes the pictures according to the syntax and semantics of a data compression (or encoding) method, such as MPEG-2, among others.

The resulting compressed video stream is transmitted preferably as a digital transmission signal over the network 18. The network 18 may include any suitable infrastructure for communicating television services data including, for example, a cable television network or a satellite television network, among others.

The STT 510 is typically situated at a user's residence or place of business and may be a stand-alone unit or integrated into another device such as, for example, a display device 120 or a personal computer (not shown). The STT 510 receives the digital transmission signal (as well as other signals, including audio and/or other data) and preferably provides reverse information to the headend 204 through the network 18. In one preferred embodiment, the STT 510 includes a video decoder 523 that receives and decodes the compressed video stream (either directly or via a coupled storage device (not shown)), and provides decoded (e.g., decompressed) pictures to the display device 120 as a television signal comprising a picture over each picture display interval. The television services are provided via the display device 120, which may be a television set that receives a television signal as an interlaced video signal from STT 510, a television set that receives a television signal as a progressive video signal, or a television set capable of receiving either of the video signal formats from the STT 510. Note that the encoder 206 can be located external to the headend 204 in some embodiments or within the DHCT 510. Similarly, the video decoder 523 may be located elsewhere in some embodiments, such as in the display device 120. The STT 510 can also receive analog transmission signals in addition to digital transmission signals.

Headend

Figure 2:
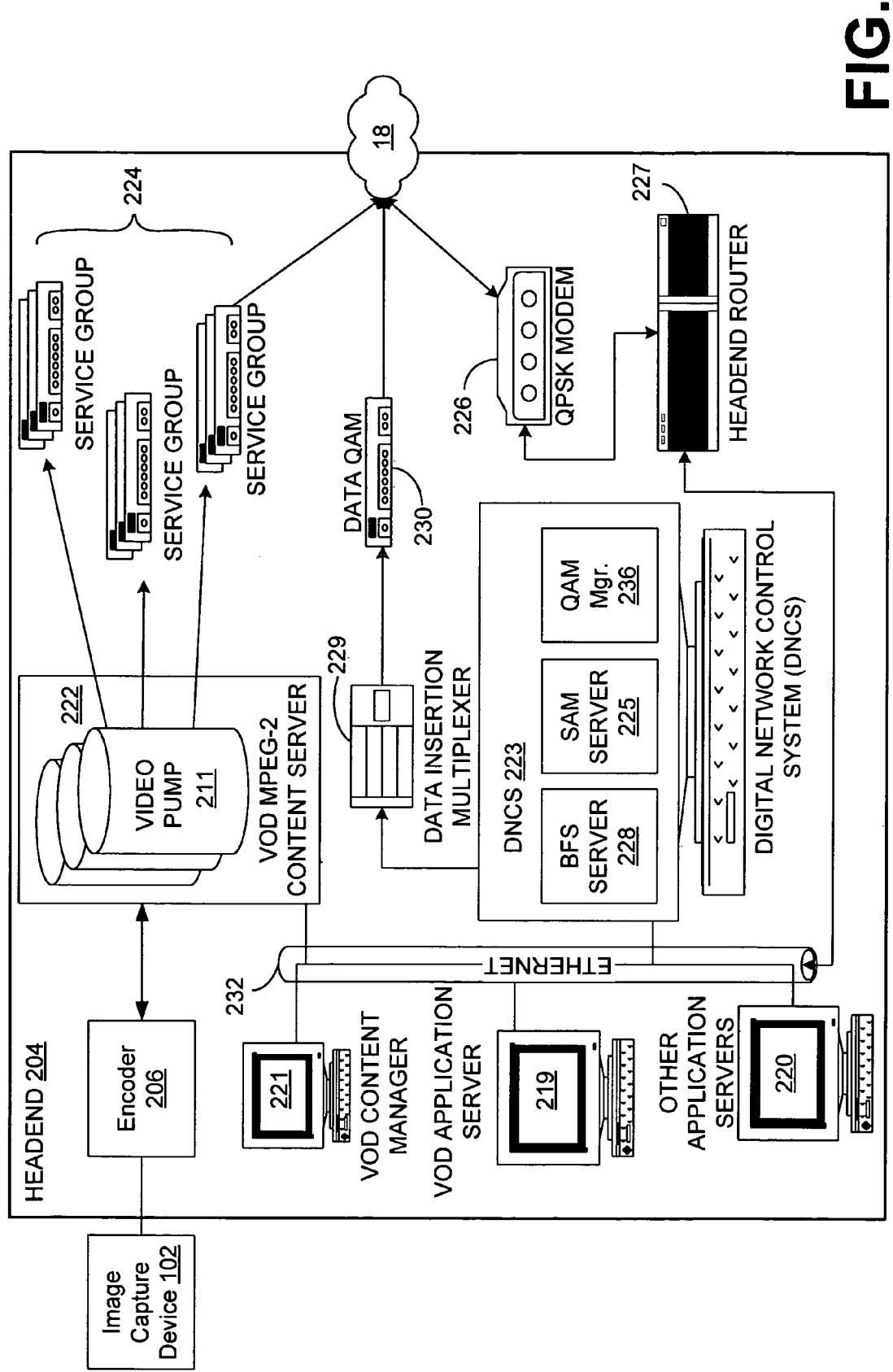
FIG. 2 is a block diagram of an example headend as shown in FIG. 1, in accordance with one preferred embodiment of the disclosure.

FIG. 2 is a block diagram of portions of one example headend 204 that is configured to provide broadcast and video-on-demand (VOD) services, in accordance with one preferred embodiment. The overview of FIG. 2 is equally applicable to one example hub, and the same elements and principles may be implemented at a hub instead of the headend 204 as described herein. In a typical system, the programming, services and other information from content providers can be distributed according to a variety of mechanisms. The input signals may be transmitted from sources to the headend 204 via a variety of transmission paths, including satellites (not shown), and terrestrial broadcast transmitters and antennas (not shown). The headend 204 can also receive content from a direct feed source via a direct line (not shown), application server (not shown), an image capture device 102, among other sources. One or more components such as the input source, the image capture device 102, and the application server can be located external to the headend 204 or internal to the headend 201 as would be appreciated by one having ordinary skill in the art. The signals provided by the content or programming input sources can include a single media content instance or a multiplex that includes several media content instances. It will be understood that the headend 204 shown in FIG. 2 is merely illustrative and should not be construed as implying any limitations upon the scope of the present disclosure.

Figure 5A:
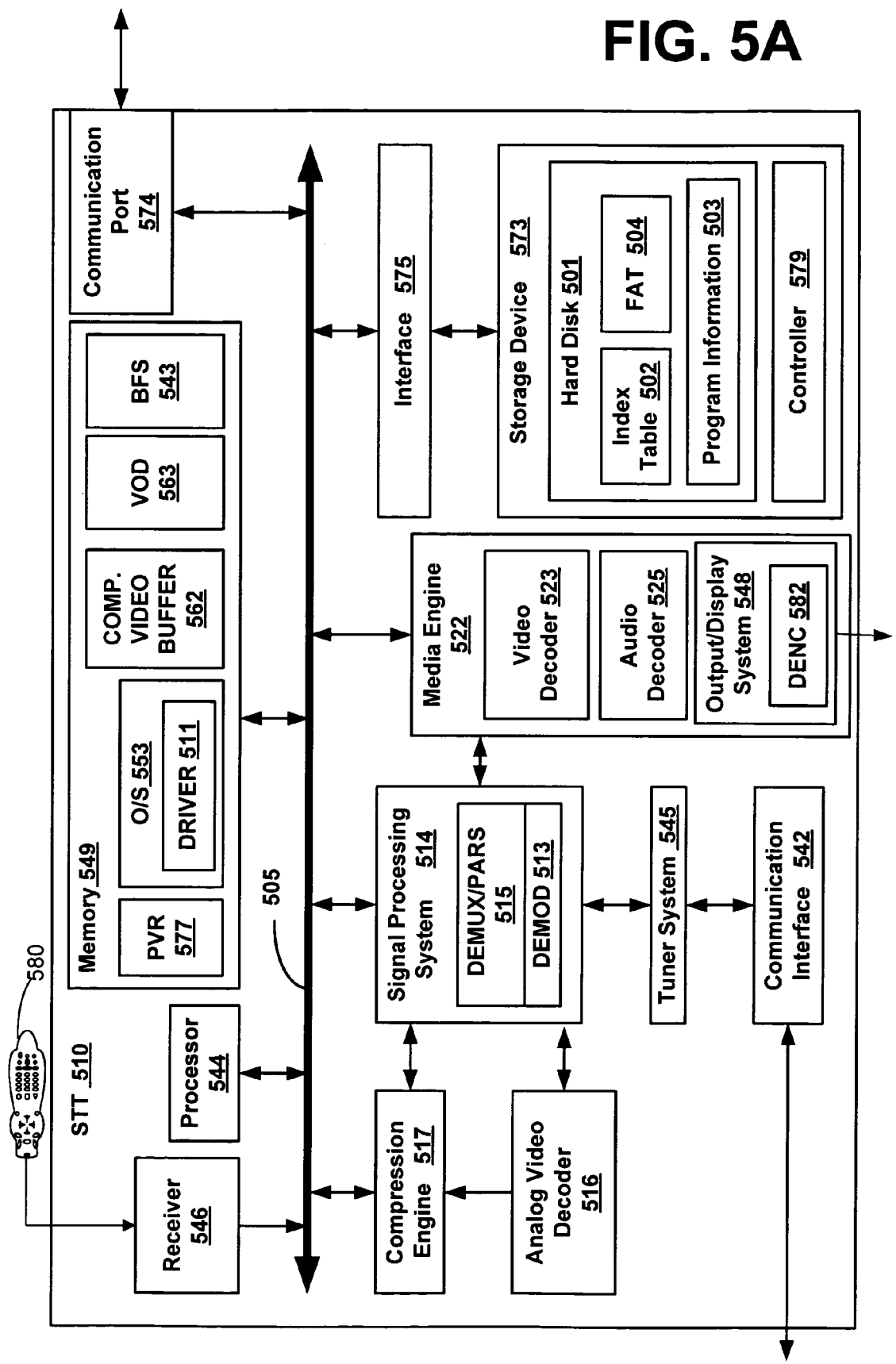
FIG. 5A is a block diagram of an example set top terminal (STT) as shown in FIG. 1, in accordance with one preferred embodiment of the disclosure.

The VOD application server 219 and a plurality of other application servers 220 are connected to a digital network control system (DNCS) 223 via a high-speed network such as an Ethernet connection 232. The VOD application server 219 is responsible for reserving and configuring system resources needed to provide VOD services and for providing configuration and service data to a VOD application 563 (FIG. 5A). While video is primarily referenced herein as the media content presented, it should be understood that various other types of media content associated with the video stream of a movie or television program are also considered to be within the scope of the preferred embodiments. In particular, one or more audio streams and/or one or more private data streams may be associated with the video stream of a movie or television program.

The DNCS 223 provides management, monitoring, and control of the network's elements and broadcast services provided to users. In one implementation, the DNCS 223 uses a data insertion multiplexer 229 and a data QAM 230 to insert in-band broadcast file system (BFS) data into an MPEG-2 transport stream that is broadcast and received via the DHCT's communication interface 542 (FIG. 5A) and tuner system 545 (FIG. 5A). The DNCS 223 also contains session management functionality, and preferably uses the Digital Storage Media Command and Control (DSM-CC) protocol to set up and maintain VOD sessions. The DNCS 223 preferably processes user to network (U-N) session signaling messages, manages allocation of session-related network resources, supports network management operations, acts as a point of contact to the network for the STTs 510 in the network 18 to establish individual sessions, and supports VOD services by providing the signaling interface to establish, maintain and release client initiated exclusive sessions. Also included within the DNCS 223 is a QAM manager 236, which is used to provide an interface for communications between the DNCS 223 and a QAM of the service (or QAM) groups 224.

A service application manager (SAM) server 225 is a server component of a client-server pair of components, with the client component being located at the STT 510 (FIG. 5A). Together, the client-server SAM components provide a system in which the user can access services.

Applications on both the headend 204 and the STT 510 (FIG. 5A) can access the data stored in a broadcast file system (BFS) server 228. The BFS server 228 is a part of a broadcast file system that has a counterpart BFS client module 543 (FIG. 5A) in the STT 510 connected to the network 18. The BFS server 228 repeatedly sends data for applications on a data carousel (not shown) over a period of time in cyclical repeated fashion so that a STT 510 that is in need of reading any particular data file or parts thereof may receive it when requested by a user or one or more of its internal running processes.

A VOD content manager 221 is responsible for managing the content on the video pumps 211 of the VOD content servers 222. The VOD application server 219 controls both the VOD content manager 221 and the VOD content servers 222 and utilizes them to help deliver the video and audio streams that make up VOD services. The QAM modulators that comprise the QAM group 224 receive the MPEG-2 transport streams from the VOD content servers 222, convert them into encrypted RF signals at a specified frequency (channel), and transmit them to the STT 510 (FIG. 5A) via the network 18.

The quadrature phase-shift keying (QPSK) modem 226 is responsible for transporting the out-of-band IP datagram traffic between the distribution headend 204 and a STT 510 (FIG. 5A). Data from the QPSK modem 226 is routed by a headend router 227 within the headend 204. The headend router 227 is also responsible for delivering upstream application traffic to the various application servers, for example application servers 219 and 220.

In one implementation, MPEG encoders, such as encoder 206, are included for digitally encoding local programming or a real-time feed from the image capture device 102, or the like. In some embodiments, the encoder 206 may provide compressed television programs and/or movies to reside on the VOD server 222 for storage in the VOD content server 222. In other implementations, an encoder of like-functionality can be located externally to the headend 204 and the compressed television programs and/or movies can be provided in transportable media. The encoder 206 can be implemented in hardware, software, or a combination of hardware and software. In one preferred embodiment, computations are performed by digital signal processors (or media processors), not shown, residing in an encoder engine (not shown), using local memory (not shown) for fast access of the pictures being processed and as needed for input and output of pictures.

Unlike the flag in an MPEG-2 video stream in which an encoder would be either explicitly instructed in its input parameter set that the input picture (or sequence of pictures) correspond to film, or programmed to attempt detection of when a sequence of input pictures have undergone a 3:2 pull-down procedure, and thereafter provide an afformative progressive value in the flag only if the sequence of pictures is indeed progressive and furthermore encoded as progressive pictures, the scan mode flag as used in accordance with the preferred embodiments conveys the scan format of the picture (or sequence of pictures) regardless of whether the pictures are compressed as progressive frames or as interlaced fields. Furthermore, the scan mode flag carries information according to a progressive scan detection method implemented by the encoder 206.

The encoder 206 detects that a picture is progressive by one of multiple methods and make annotations in the scan mode flag accordingly. Each line of a frame is processed in one of three different forms or any set resulting from the combination of the three forms. The first form of a line is its original form, represented by the luminance (or luma) values of its corresponding pixels and their corresponding chrominance (or chroma) values. The second form of a line corresponds to a candidate representing an interlaced scan picture and comprises assigning the corresponding pixel values of a low-pass filter (not shown) performed on a small set of consecutive lines from what would constitute a corresponding field. For example, three lines are used as input to the low pass filter to obtain the second form of the line: the line itself, the alternate (or second) line above and the alternate line (or second line) below. The third form of a line corresponds to a candidate representing a progressive scan picture and comprises assigning the corresponding pixel values of a low-pass filter performed on the small set of consecutive lines assuming that the picture is from a progressive scan source. Thus, the third form of a line is derived from the low pass filter operation from the line itself and the immediate line above and the immediate line below. Each form of the line that is employed in the determination (i.e., could be form 1 only, the three forms, or any subset of the three forms) is processed further by using a first-order one-dimensional differential operator, representative of the discrete version of a first-order derivative, to obtain a profile of vertical edges in the line. The forms resulting from low pass filtering help eliminate impulsive noise and reinforce the original line.

The actual edge position and corresponding strength of each edge in a form of a line is found by non-maxima suppression of the response of the first order differential operator. The different forms of a line are used to validate the existence of edges. The signature or amplitude of the vertical edge profile created as a result of these operations is compared to the signature of the two adjacent lines (one immediately above and below) to obtain a matching score representative of a progressive scan format. Similarly, the comparison to the second line above and second line below serve as a matching score representative of an interlaced scan format. The matching score comprises of analyzing the vertical edge profiles by identifying the location of peaks, valleys, slopes, and the amplitude (which is a measure of contrast due to the first-order differential operation), or any combination thereof. Portions of the current line are displaced by a number of pixels to the left and/or right (or as suggested by aligning the most significant peaks) and respective matching scores are obtained. In this way, non-vertical contours of object are accommodated. A matching score is obtained from the analysis for a progressive scan candidate and for an interlaced scan candidate. A matching score is considered valid if above a predetermined threshold, such threshold predetermined, in one preferred embodiment, by empirical analysis. The highest matching score determines the candidacy of the line, either progressive scan or interlaced scan, and both matching scores are retained until the same analysis is performed for a predetermined subset of consecutive lines throughout the picture. For example, a set of five consecutive lines (or parts of five consecutive lines) is analyzed at a top-most section of the picture, another set of five lines at the bottom, and two more sets of five lines equally spread apart towards the middle of the picture's ordinate. The final determination of whether the picture is of progressive or interlaced scan is determined from the analysis of each set of consecutive lines, including their determined candidacy and respective matching scores.

As an alternative to vertical edge profile analysis, a correlation function can be performed to small sets of consecutive lines or as a mechanism to reinforce the vertical edge profile analysis.

Alternatively, all sets of consecutive and adjacent lines throughout the picture can be selected in the analysis if designed into the computation and processing capabilities of the encoder.

The encoder 206 further analyzes the characteristics of each picture to determine if film grain noise exists, thus further validating the existence of film. Film grain noise is assessed from variations in edge profile of the first form of a line and from the frequency response of the spatial information in pictures. The latter is preferably obtained by performing a decorrelation transform (such as the discrete cosine transform) in a small set of rectangular regions in the picture. Furthermore, analysis of film grain is concentrated towards the periphery of each picture.

Scan Formats

Figure 3:
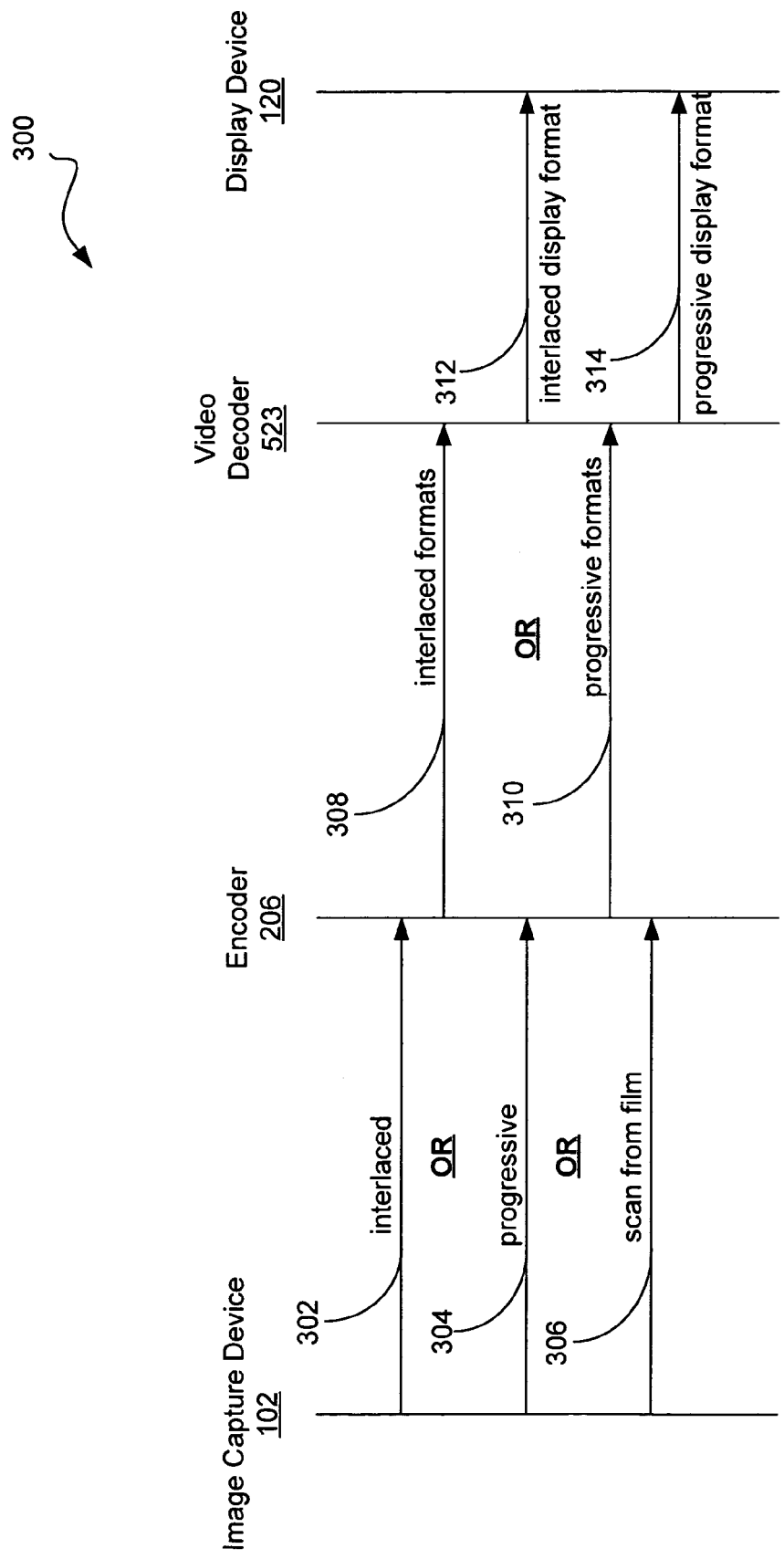
FIG. 3 is a diagram that illustrates the propagation of scan formats through a picture's lifetime starting at a time of picture capture or creation time through compression, decompression, and display, in accordance with one preferred embodiment of the disclosure.
Figure 4:
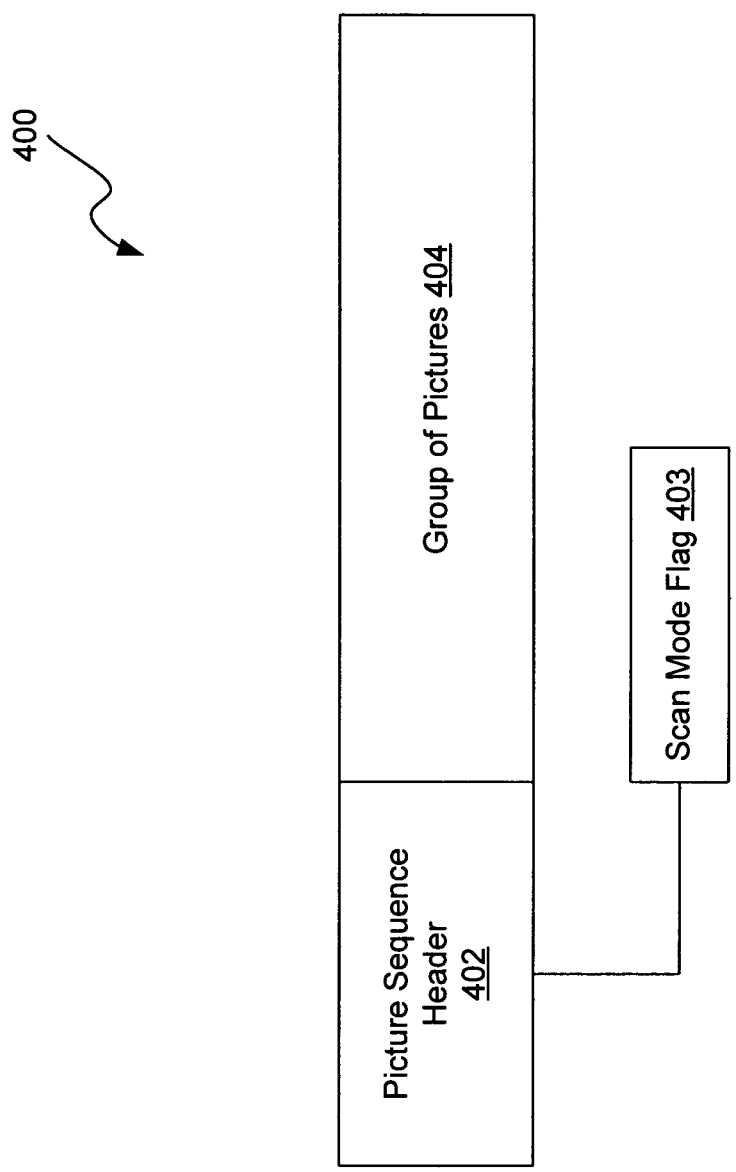
FIG. 4 is a block diagram of an example of a stream packet in a compressed video stream that includes a scan mode flag in the picture sequence header, in accordance with one preferred embodiment of the disclosure.

FIG. 3 is a timing diagram 300 that illustrates the variety of scan formats of which a picture can be configured from its creation time to the time the picture is presented for output to the display device 120, in accordance with several embodiments of the invention. Shown in the timing diagram 300 are some relevant components included in the process of capturing, conditioning, and delivering a picture for viewing by a user, including an image capture device 102 such as a camera or optical scanner, an encoder 206, a video decoder 523, and a display device 120. In one preferred embodiment, the image capture device 102 operates in an interlaced format (e.g., functionality includes a shutter mechanism that captures sequential snapshots of the scene as a top field and then the alternate lines as a bottom field, then as a top field, then as a bottom field, and so on) to provide the picture as an interlaced scan format 302. In some embodiments, the image capture device 102 can be configured to capture the entire picture, thus providing a progressive scan format 304. In a third embodiment, the pictures are provided to the encoder 206 from a configured scan operation of film produced by a film camera and the film exhibits a film format 306.

The encoder 206 receives the picture in one of the aforementioned scan formats and encodes the picture for delivery over the STS 100 (FIG. 1). As shown, the received picture can be encoded according to the compression methods of the encoder 206 that enables each individual picture to be encoded as an interlaced format 308, a progressive format 310, or as a combination of both, regardless of the scan format of each input picture to the encoder 206. However, the encoder 206 is preferably optimized to make decisions to encode each input picture by exploiting its native scan format. For example, an input picture that was "born" as a progressive scan format 304 can be encoded as an interlaced scan format 308 for any of a number of reasons (e.g., if 3:2 pulldown was performed a priori in transmission, due to editing, or to preserve close-caption data with the proper picture). As another example, a picture received as input to the encoder 206 and received in the interlaced scan format 302 can be encoded as progressive 310 because that is how the encoder 206 was programmed to operate. For example, the encoder 206 could be designed to encode progressive pictures for memory organization purposes, because it first de-interlaces the incoming interlaced pictures, or because it assumes that the compressed video stream will be displayed in a display device that accepts a progressive television signal.

When the video decoder 523 receives the compressed digital stream comprising the encoded picture, the video decoder 523 determines the scan format of the original picture and provides the picture to the display device 120, for example an interlaced display format 312 for an interlaced display device 120 or a progressive display format 314 for the display device 120 configured as a progressive display device. In one preferred embodiment of the disclosure, the video decoder 523 determines the scan format of the source by interrogating picture sequence headers of the compressed video stream or from the corresponding annotations for each picture or set of pictures, such annotations included in a file or in the headers of the video bitstream.

Compressed Video Stream

In one preferred embodiment, the compressed video stream includes a scan mode flag that is inserted by the encoder 206 upon detecting the image capture device scan format. With continued reference to FIGS. 1-3, FIG. 4 is a block diagram of an example stream packet 400 in a compressed video stream. As one example, the stream packet 400 is described in the context of an MPEG-compliant compressed video stream, with the understanding that compressed video streams compliant to other standards are contemplated to be within the scope of the disclosure. The stream packet 400 includes a picture sequence header 402 and a group of pictures (GOP) sequence 404. As is well known to those having ordinary skill in the art, several pictures form a GOP. The GOP typically begins with an I picture and may or may not include P and B pictures. Several GOPs form a GOP sequence 404, which preferably begins with the picture sequence header 402. The picture sequence header 402 includes information for the video decoder 523, such as the MPEG profile and level, whether the chroma format is 4:2:0 or 4:2:2, the size of the picture, and the aspect ratio of the pixels. In accordance with one preferred embodiment of the disclosure, the picture sequence header 402 also includes a scan mode flag 403 that is inserted by the encoder 206 upon detecting the scan format of the source picture (i.e., from the image capture device 102). The scan mode flag 403 can be in each picture header or sequence header (and sequence headers are repeated periodically), or the scan mode flag 403 can be disposed in a separate file by itelf, or integrated in a file with annotations, or any combination of the above.

The scan mode flag 403 indicates to the video decoder 523 whether the pictures sourced from the image capture device 102 are of a progressive or interlaced scan format. One intent of the scan mode flag 403 is to convey to the video decoder 523 the scan format effected at the time the picture's first creation, when the picture was originally captured and formed. The video decoder 523 preferably uses the information the scan mode flag 403 conveys to provide processing aid to the video decoder 523 while performing trick modes, including which fields to employ to reconstruct a picture for display, and whether a picture has to be de-interlaced prior to outputting for display.

Set Top Terminal

FIG. 5A is a block diagram illustrating selected components of an STT 510 in accordance with one preferred embodiment of the disclosure. It will be understood that the STT 510 shown in FIG. 5A is merely illustrative and should not be construed as implying any limitations upon the scope of the preferred embodiments of the disclosure. For example, in some embodiments, the STT 510 may have fewer, additional, and/or different components than those illustrated in FIG. 5A. A STT 510 is typically situated at a user's residence or place of business and may be a stand alone unit or integrated into another device such as, for example, a television set or a personal computer. The STT 510 preferably includes a communications interface 542 for receiving signals (video, audio and/or other data) from the headend 204 (FIG. 1) through the network 18 (FIG. 1) and for providing reverse information to the headend 204.

The STT 510 further preferably includes at least one processor 544 for controlling operations of the STT 510, an output/display system 548 for driving the display device 120 (FIG. 1), and a tuner system 545 for tuning to a particular television channel or frequency and for sending and receiving various types of data to and from the headend 204 (FIG. 1). The STT 510 may, in some embodiments, include multiple tuners for receiving downloaded (or transmitted) data. The tuner system 545 can select from a plurality of transmission signals provided by the subscriber television system 100 (FIG. 1). The tuner system 545 enables the STT 510 to tune to downstream content (i.e., data, video, and/or audio) transmissions, thereby allowing a user to receive digital and/or analog content via the subscriber television system 100. The tuner system 545 includes, in one implementation, an out-of-band tuner for bidirectional quadrature phase shift keying (QPSK) data communication and a quadrature amplitude modulation (QAM) tuner (in band) for receiving television signals. Additionally, a receiver 546 receives externally-generated user inputs or commands from an input device such as, for example, a remote control device 580.

Figure 5B:
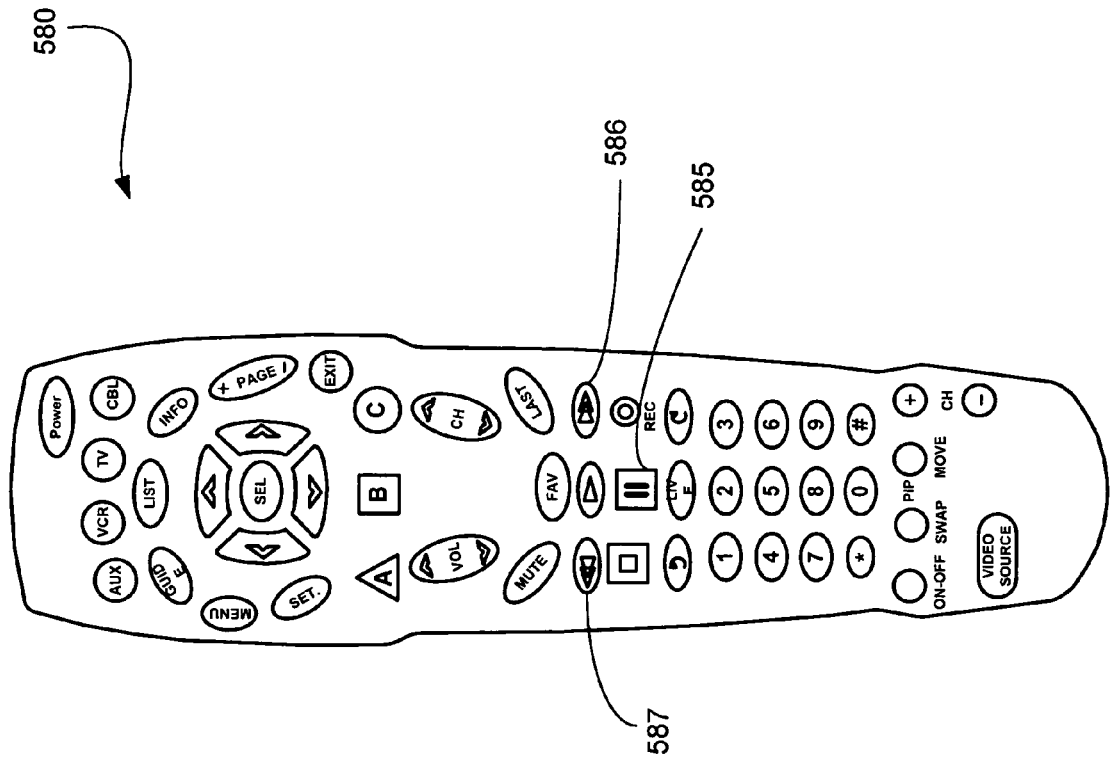
FIG. 5B is a schematic diagram of an example remote control device used to provide input to the example STT of FIG. 5A, in accordance with one preferred embodiment of the disclosure.

FIG. 5B is a schematic diagram of the example remote control device 580 shown in FIG. 5A, in accordance with one preferred embodiment of the disclosure. Pause button 585, fast-forward button 586, and rewind button 587 are buttons used by a user to activate playback mode operations (e.g., trick modes) during displayed programming. Similarly, a slow forward playback and slow reverse playback (not shown) in remote control 580 may activate respective slow playback modes. Many alternative methods of providing user input may be used including a remote control device with different buttons and/or button layouts, a keyboard device, a voice activated device, etc. The embodiments described herein are not limited by the type of device used to provide user input.

Continuing with reference to FIG. 5A, the STT 510 may include one or more wireless or wired interfaces, also called communication ports 574, for receiving and/or transmitting data to other devices. For instance, the STT 510 may feature USB (Universal Serial Bus), Ethernet, IEEE-1394, serial, and/or parallel ports, etc. The STT 510 may also include an analog video input port for receiving analog video signals.

The STT 510 includes a signal processing system 514, which comprises a demodulating system 513 and a transport demultiplexing and parsing system 515 (herein demultiplexing system 515) for processing broadcast media content and/ or data. One or more of the components of the signal processing system 514 can be implemented with software, a combination of software and hardware, or preferably in hardware. The demodulating system 513 comprises functionality for demodulating analog and/or digital transmission signals. For instance, the demodulating system 513 can demodulate a digital transmission signal in a carrier frequency that was modulated, among others, as a QAM-modulated signal.

When tuned to a carrier frequency corresponding to an analog TV signal, the demultiplexing system 515 is bypassed and the demodulated analog TV signal that is output by the demodulating system 513 is instead routed to an analog video decoder 516. The analog video decoder 516 converts the analog TV signal into a sequence of digitized pictures and their respective digitized audio. The digitized pictures and respective audio output by the analog video decoder 516 are presented at the input of a compression engine 517.

The compression engine 517 multiplexes the audio and video compressed streams, and in some embodiments, a file comprising of annotations and auxiliary information, into a transport stream, such as an MPEG-2 transport stream. Furthermore, the compression engine 517 can preferably compress audio and video corresponding to more than one program in parallel (e.g., two tuned analog TV signals when STT 510 has multiple tuners) and multiplex the respective audio and video compressed streams into a single transport stream. The output of compressed video streams and/or transport streams produced by the compression engine 517 is input to the signal processing system 514.

The compression engine 517 multiplexes the audio and video compressed video streams, and in some embodiments, a file comprising of annotations and auxiliary information, into a transport stream, such as an MPEG-2 transport stream. Furthermore, the compression engine 517 can preferably compress audio and video corresponding to more than one program in parallel (e.g., two tuned analog TV signals when STT 510 has multiple tuners) and multiplex the respective audio and video compressed streams into a single transport stream. The output of compressed video streams and/or transport streams produced by the compression engine 517 is input to the signal processing system 514.

In one preferred embodiment, the digital compressed video streams output by the compression engine 517 corresponding to a video stream are routed to the demultiplexing system 515. The demultiplexing system 515 parses (i.e., reads and interprets) the transport stream generated by the compression engine 517 without disturbing its content and deposits the transport stream into memory 549. The processor 544 causes the transport stream in memory 549 to be transferred to the storage device 573. In a preferred embodiment, while parsing the transport stream, the demultiplexing system 515 outputs to memory 549 ancillary data in the form of a table or data structure comprising the relative or absolute location of the beginning of certain pictures in the compressed media content stream for the video stream for facilitating retrieval during future operations. In this way, playback mode operations such as fast forward and rewind to a location in the compressed video stream can be attained. Additional pertinent data such as to assist in decoding and output of pictures during trick modes is also written in the tables, as described below.

Parsing capabilities within the demultiplexing system 515 of the signal processing system 514 allow for interpretation of picture sequence headers and picture headers, and annotating their locations within their respective compressed video stream as well as other useful information for future retrieval and support of trick mode operations from a storage device 573, as described below. A compressed video stream (e.g., corresponding to a TV program episode or show) that is received via a tuned analog transmission channel can be output as a transport stream by the signal processing system 514 and presented as input for storage in the storage device 573 via a communication interface 575. The packetized compressed video streams can be also output by the signal processing system 514 and presented as input to a media engine 522 for decompression by the video decoder 523 and the audio decoder 525 for subsequent output to the display device 120 (FIG. 1).

A plurality of compression engines 517 may be used to simultaneously compress a plurality of analog video streams. Alternatively, a single compression engine 517 with sufficient processing capabilities may be used to compress a plurality of analog video streams. Compressed digital versions of respective analog video streams may be routed to the hard disk 501 of the storage device 573. Data annotations for each of the video streams may be performed to facilitate future retrieval of the video streams from the storage device 573 and to assist in decoding and output of pictures during trick modes. Depending on requirements in effect at an instance of time, only a subset of the total number of compressed digital video signals may be routed to the storage device 573. Any of the received video streams can also be routed simultaneously to the media engine 522 for decoding and subsequent presentation via the display device 120 (FIG. 1).

Note that functionality of the compression engine 517 may be in the STT 510 as described, in the headend 204 (FIG. 2), or in other locations that produced the video streams for transmission and/or to store in the VOD server 222 (FIG. 2).

The demultiplexing system 515 also includes transport demultiplexing, such as for MPEG-2. The following description of the STT 510 corresponding to digital transmission will be understood in the context of MPEG-2 transport, with the understanding that other standards and/or compression methodologies are within the scope of the preferred embodiments. When tuned to carrier frequencies carrying a digital transmission signal, the demultiplexing system 515 enables the separation of packets of data, corresponding to the desired video streams, for further processing. Concurrently, the demultiplexing system 515 precludes further processing of packets in the multiplexed transport stream that are irrelevant or not desired such as, for example, packets of data corresponding to other video streams.

The components of the signal processing system 514 are preferably capable of QAM demodulation, forward error correction, demultiplexing of MPEG-2 transport streams, and parsing of packetized elementary streams and elementary streams. The signal processing system 514 further communicates with the processor 544 via interrupt and messaging capabilities of the STT 510. The processor 544 annotates the location of pictures within the compressed video stream as well as other pertinent information such as the type of scan format detected. The annotations by the processor 544 enable normal playback or other playback modes of the stored compressed video stream.

The demultiplexing system 515 parses (i.e., reads and interprets) compressed video streams to interpret picture sequence headers and picture headers, and deposits a transport stream carrying compressed video streams into memory 549. The processor 544 causes the transport stream to be transferred from memory 549 to the storage device 573 via the communication interface 575. Upon demultiplexing and parsing the transport stream carrying one or more video streams, the processor 544 interprets the data output by the signal processing system 514 and generates ancillary data in the form of a table or data structure comprising the relative or absolute location of the beginning of certain pictures in the compressed video stream. Such ancillary data is used to facilitate the retrieval of desired video data during future operations and to assist in decoding and output of pictures during trick modes. The scan format is annotated as a result of a scan format detection procedure, as described below.

A compressed video stream corresponding to a tuned carrier frequency carrying a digital transmission signal can be output as a transport stream by the signal processing system 514 and presented as input for storage in the storage device 573 via the communication interface 575. The packetized compressed video streams can be also output by the signal processing system 514 and presented as input to the media engine 522 for decompression by the video decoder 523 and the audio decoder 525.

One having ordinary skill in the art will appreciate that the signal processing system 514 may include other components not shown, including memory, decryptors, samplers, digitizers (e.g. analog-to-digital converters), and multiplexers, among others. Further, other embodiments will be understood, by those having ordinary skill in the art, to be within the scope of the preferred embodiments of the present invention. For example, analog signals (e.g., NTSC) may bypass one or more elements of the signal processing system 514 and may be forwarded directly to the output/display system 548. Outputs presented at corresponding next-stage inputs for the aforementioned signal processing flow may be connected via accessible memory 549 in which an outputting device stores the output data and from which an inputting device retrieves it. Outputting and inputting devices may include the analog video decoder 516, the compression engine 517, the media engine 522, the signal processing system 514, and components or sub-components thereof.

In one preferred embodiment of the invention, a plurality of tuners and respective demodulating systems 513, demultiplexing systems 515, and signal processing systems 514 may simultaneously receive and process a plurality of respective broadcast digital video streams. Alternatively, a single demodulating system 513, a single demultiplexing system 515, and a single signal processing system 514, each with sufficient processing capabilities may be used to process a plurality of digital video streams.

In yet another embodiment, a first tuner in tuning system 545 receives an analog video signal corresponding to a first video stream and a second tuner simultaneously receives a digital compressed video stream corresponding to a second video stream. The first video stream is converted into a digital format. The second video stream and/or a compressed digital version of the first video stream are routed to the hard disk 501 of the storage device 573. Data annotations for each of the two streams are performed to facilitate future retrieval of the video streams from the storage device 573 and to assist in decoding and output of pictures during trick modes. The first video stream and/or the second video stream may also be routed to media engine 522 for decoding and subsequent presentation via the display device 120 (FIG. 1).

In one implementation, video streams are received in the STT 510 via the communications interface 542 and stored in a temporary memory cache (not shown). The temporary memory cache may be a designated section of memory 549 or an independent memory attached directly to the communication interface 542. The temporary cache is implemented and managed to enable content transfers to the storage device 573. In one implementation, the fast access time and high data transfer rate characteristics of the storage device 573 enable media content to be read from the temporary cache and written to the storage device 573 in a sufficiently fast manner. Multiple simultaneous data transfer operations may be implemented so that while data is being transferred from the temporary cache to the storage device 573, additional data may be received and stored in the temporary cache.

The storage device 573 is preferably a hard disk drive but may in an alternative embodiment be any type of magnetic, optical, or semiconductor based storage device. The storage device 573 is preferably internal to the STT 510, coupled to a common bus 505 through the communication interface 575. The communication interface 575 is preferably an integrated drive electronics (IDE) or small computer system interface (SCSI), although another interface such as, for example, IEEE-1394 or USB, among others, may be used. Alternatively, the storage device 573 can be externally connected to the STT 510 via a communication port 574. The communication port 574 may be, for example, an IEEE-1394, a USB, a SCSI, or an IDE, among others.

The storage device 573 preferably includes at least one hard disk 501 and a controller 579. A PVR application 577, in cooperation with the operating system 553 and the device driver 511, effects, among other functions, read and/or write operations to the storage device 573. The device driver 511 is a software module preferably resident in the operating system 553. The device driver 511, under management of the operating system 553, communicates with the storage device controller 579 to provide operating instructions for the storage device 573. The controller 579 receives the operating instructions from the device driver 511 and implements those instructions to cause read and/or write operations to the hard disk 501. Herein, references to write and/or read operations to the storage device 573 will be understood to include operations to the medium or media of the storage device 573 unless indicated otherwise. As conventional device drivers and device controllers are well known to those of ordinary skill in the art, further discussion of the detailed working of each will not be described further here.

The operating system 553, in cooperation with the device driver 511, communicates with the storage device controller 579 to format the hard disk 501. In one preferred embodiment of the invention, the operating system 553, device driver 511, and controller 579 cooperate to create a file allocation table (FAT). The FAT 504 is where the operating system 553 stores the information about the hard disk clusters and the files associated with those clusters. The operating system 553 can determine where a file's data is located by using the directory entry for the file and file allocation table (FAT) entries. The directory entry gives information about a directory such as its related files and subdirectories. A FAT entry describes the physical locations of data for a video stream file (i.e. the file that the video stream is written to on the hard disk 501). Similarly, the FAT 504 also keeps track of which clusters are free, or open, and thus available for use. When an application such as the PVR application 577 creates (or extends) a video stream file, the operating system 553, in cooperation with the device driver 511, queries the FAT 504 for an available cluster to begin writing the video stream.

As a non-limiting example, to buffer a downloaded video stream into the storage device 573, the PVR application 577 creates a video stream file and video stream file name for the video stream to be downloaded. The operating system 553, in cooperation with the device driver 511, checks the FAT 504 for an available, or writeable, cluster to write the video stream to. The PVR application 577 effects the device driver 511, through communication with the operating system 553, to cause the controller 579 to write the downloaded video stream to the available cluster under a particular video stream file name. The FAT 504 is then updated with the new video stream file name corresponding to the available cluster. If the video stream requires more data space than what the cluster can offer, the operating system 553 queries the FAT 504 for the location of another available cluster to continue writing the video stream to hard disk space. Upon finding another cluster, the FAT 504 is updated to keep track of which clusters are linked to store a particular video stream under the given video stream file name.

A multiplicity of clusters may be required to write a file corresponding to a compressed video stream to the hard disk 501. The clusters corresponding to one particular video stream file may or may not be adjacent or contiguous clusters. That is, the clusters corresponding to a particular video stream file can be fragmented throughout the hard disk space. As described earlier, the FAT 504 keeps track of which clusters are employed to write a downloaded video stream to the hard disk 501. Further, systems well known to those of ordinary skill in the art, such as defragmentators, can be employed to cause the clusters associated with a particular video stream file to be contiguous.

Scan Detection Processing

Because the video decoder 523 is housed in the same STT 510 as the compression engine 517, when the STT 510 is to effect a trick mode, the processor 544 controls the operation of the video decoder 523 by parsing the information in the file with the auxiliary annotations and writing data and/or instructions to registers (not shown) or a control mechanism of the video decoder 523. The processor 544 also controls the picture data that is fed to output/display system 548. The processor 544 ascertains whether the picture is progressive by examining the annotations provided by the compression engine 517 such as carried in one or more flags including the scan mode flag. According to the playback speed required to effect the trick mode operation and whether its forward or backward playback, the processor 544 enables decompressed pictures to be fed repeatedly over consecutive picture display intervals to the output/display system 548 to provide from the STT 510 the required output TV signal. Furthermore, according to the format for the television signal that is to be output by the STT 510, and according to the scan format in the annotation for the corresponding compressed picture (or set of pictures), and possibly according to the scan format used to compress the picture, the processor 544 sets up and coordinates whether one or both fields of a picture are fed to the output/display system 548, and whether any one or both fields are modified prior to output and if so, when they are modified.

The data and/or instructions provided by the processor 544 to the video decoder 523 thus signify whether a picture is progressive or interlaced, and further controls: whether the video decoder 523 decodes one or both fields of a compressed picture, whether one or both fields of the decompressed picture are displayed, and whether any of the fields of the decompressed picture need to undergo additional processing prior to output. During a trick mode operation, there are a number of factors that may determine whether a picture is displayed repeatedly over multiple consecutive picture display intervals. These factors include the playback speed and direction, the scan format of the picture at its creation time, the manner in which the picture was encoded (i.e., as fields or frames), and which type of display device the STT 510 is driving. In some situations, all these factors coupled with the processing and computing capabilities of STT 510 determine whether a picture may have to be displayed repeatedly over consecutive picture display intervals to effect the speed of a first type of trick mode operation. In a second type of trick mode operation (e.g., very slow forward playback), the processing and computing capabilities of STT 510 have virtually no bearing on how much processing can be performed to output a picture for display.

In another implementation, such as where the compression engine 517 encodes analog transmission signal borne pictures, an inverse telecine detection operation (i.e., detection that a sequence of pictures to be encoded were from a progressive source that subsequently underwent a 3:2 pull-down operation), or a progressive picture detection operation, can be performed to detect pictures in which both fields correspond to the same "capture" or creation time and thus represent a progressive scan format. Such pictures are called progressive pictures. A driver (not shown) that is part of the compression engine 517 annotates information associated with personal video recording functionality of the STT 510 to allow the video decoder 523 to later display both fields. Hence, the driver also annotates whether a picture's scan format is progressive with an affirmative progressive value in the scan mode flag. In one preferred embodiment, the auxiliary annotations are written to a designated section of a separate file in a storage device 573 that corresponds to the respective video being compressed. In another embodiment, the annotations are included in a data element (or data field or flag) of the compressed video stream. The annotation can be part of a picture header or a sequence header that is repeated over a predetermined amount of time in the bitstream or over each defined number of consecutive compressed pictures.

As an example implementation utilizing the PVR functionality of the STT 510, assume the STT 510 receives a video stream, formatted as an MPEG-2 stream, from the headend 204 (FIG. 2), and then stores it in the hard disk 501. The MPEG-2 stream is made up of multiple picture sequences wherein each picture sequence has a header. The beginning of each picture and picture sequence is determined by a start code. As the MPEG-2 stream is being stored in hard disk 501, the processor 544 creates a corresponding index table 502. The index table 502 consists of elements that point to data in the hard disk 501 that define picture and sequence boundaries in the MPEG-2 stream. The index table 502 facilitates the delivery of selected data to the video decoder 523. The index table 502 may include the following information about the MPEG-2 stream:

a) The storage location of each of the sequence headers;
    b) The storage location of each picture start code;
    c) The type of each picture (I, P, or B);
    d) The real time of when each picture was stored; and/or
    e) The scan format detected for each picture or set of pictures (e.g., a GOP).

In addition to creating an index table 502, the processor 544 stores program information related to the MPEG-2 stream in a program information file 503. The program information file 503 includes the packet identification codes (PIDs) contained in the MPEG-2 stream as well as a flag that represents whether the stream contains I pictures. A determination as to whether the MPEG-2 stream contains I pictures may be made by inspecting a predetermined number of picture sequences; if no I-frame is found within the predetermined number of picture sequences, then the flag is set to false.

The STT 510 receives user input requesting playback mode functionality (herein described as a playback mode request). The user input may be provided via, for example, the remote control device 580. In addition to specifying a video stream and/or its associated compressed video streams, a playback mode request for a compressed video presentation stored in the storage device 573 may specify information that includes the playback mode, direction of playback, entry point of playback with respect to the beginning of the compressed video presentation, and playback speed, if applicable. In addition, activation of a playback mode may also specify the duration of the mode. Playback speed is applicable to playback modes other than the pause display and may be specified as a factor or proportion of the normal playback speed. Speed may be implied by how long the key is pressed by a user or via visual feedback presented on the screen. Direction of playback may also be implied by which key the user pressed.

The entry point for playback is relative to the beginning of the compressed video presentation stored in the storage device 573 and may be specified in a number of different ways according to the predetermined format for a request's specification. As a non-limiting example, the entry point in the request for which to start playback may be specified in relation to the beginning of the video presentation as elapsed normal playback time, number of pictures, or number of certain types of pictures.

In response to a request for retrieval and playback of a compressed video stream for which the playback mode is a "pause-display" and for which the entry point is at the beginning of the compressed video stream, the processor 544, in communication generally with the device driver 511 and the storage device controller 579 and the demultiplexing system 515, effects retrieval of compressed video data from the storage device 573 that correspond to one or more video streams specified in the request. In general, one or more compressed video streams are deposited in an output cache (not shown) in the storage device 573, transferred to memory 549, and then the compressed video streams are routed to the video decoder 523 and audio decoder 525 for decoding and delivery to the display device 120 (FIG. 1). In some embodiments, the compressed video streams are retrieved and routed from the hard disk 501 to the video decoder 523 and the audio decoder 525 simultaneously, and then further processed for subsequent presentation via the display device 120.

In response to a request for playback modes that are not "pause-display", or for which the entry point is not at the beginning of the compressed video stream, the processor 544 in communication generally with the device driver 511 and the storage device controller 579 reads information in the respective entry in the index table 502 for the requested compressed video stream to retrieve annotation data from storage device 573 that corresponds to the requested video streams specified in the request. Immediately thereafter under program control, the processor 544 retrieves the program information file 503 from the storage device 573 and interprets the program information file 503 to compute the entry point location for which to fulfill the specified playback mode in the request. In a preferred embodiment, information pertaining to the characteristics of the compressed video stream is contained in the program information file 503 and interpreted to fulfill the specified playback mode in the request. The requested playback mode is implemented by the processor 544 based in part on the characteristics of the compressed data, the playback mode specified in the request, and the processing and computing capabilities of STT 510. Depending on the processing and computing capabilities of STT 510, a picture may have to be displayed repeatedly over consecutive picture display intervals to effect the speed of a trick mode operation. Retrieved streams are deposited in an output cache in the storage device 573, transferred to memory 549, and then the compressed video streams are processed for playback by the processor 544 under program control and in communication with the video decoder 523. In some embodiments, the compressed video streams may retrieved and routed from the hard disk 501 directly to the digital video decoder 523 and the digital audio decoder 525 simultaneously, and then further processed for eventual presentation on a display device 120 (FIG. 1).

In VOD implementations, communication between the headend 204 (FIG. 2) and the STT 510 via the communications interface 542 allows the STT 510 to establish a session with the VOD server 222 (FIG. 2) at the headend 204 to allow the STT 510 to receive a movie through a VOD service. While a movie or television program is received by the STT 510 and output for display to a user, the user may invoke a playback mode other than normal playback. Responsive to the user's input, and under the established session requiring a direct connection between STT 510 and the VOD server 222, the headend 204 receives and interprets the user's request for a trick mode operation, and thereafter transmits the compressed video (or parts thereof) from the VOD server 222 with a "trick mode" flag in the video bitstream that specifies to the video decoder that its management procedures of the buffer 562 wherein the compressed video stream is deposited is to be performed in a different manner. In such case the video decoder 523 allows the compressed video buffer 562 (which although shown in memory 549 may preferably be in a memory that is directly connected to video decoder 523) to violate its fullness requirements (i.e., to underflow or to overflow according to certain timing specifications). The video decoder 523 further ensures not to feed a picture to the output/display system 548 until it has been fully decoded and reconstructed (and hence received in full in the compressed video buffer 562). Since the video decoder 523 may not provide a new picture for output until it has reconstructed a new one in full, a trick mode flag further allows the STT 510 to enter an output operation mode in which the last fully reconstructed picture for display in memory, possibly composed from multiple pictures and/or processed through a deinterlacer (not shown), continues to be retained in memory (again the memory that is local to the video decoder 523) and fed repeatedly for output over consecutive picture display intervals.

Therefore, pictures provided during trick modes through the tuned channel corresponding to a VOD service, typically require that a reconstructed picture be displayed repeatedly over consecutive picture display intervals, although not necessarily so.

In one preferred embodiment, a video program or movie resides in a VOD server 222 (FIG. 2) in the headend 204 (FIG. 2) with its respective annotations, including the scan mode flag for corresponding pictures or set of pictures according to the implementation of picture scan detection as explained above. A file containing the annotations can be transmitted during the initial phase of a VOD session, soon after a viewer first instantiates the VOD service by requesting a movie that resides in the VOD server 222. Upon reception, the file is stored in memory 549 or the storage device 573 of the STT 510. Alternatively, the file or parts thereof can be transmitted as a private data stream simultaneously with the video bitstream, and its corresponding audio stream, preferably only during those intervals of time when a trick mode operation is in effect. The file is received by the communication interface 542, through the tuner 545, and stored in memory 549. The processor 544 proceeds to retrieve the file from memory 549 to parse the information and operate as described above by writing data and/or instructions to registers or a control mechanism of the video decoder 523.

In yet another embodiment, during effecting a trick mode operation, the processor 544 provides data or instructions to the video decoder 523 to perform in a manner designated for a trick mode operation, wherein the video decoder 523 detects or determines if the current portion of the compressed video (possibly each individual picture) is a progressive or interlaced picture, and then determines according to the trick mode operation if the picture is required to be displayed more than once repeatedly over consecutive picture display intervals of the output TV signal. In other words, the behavior of the video decoder 523 and what picture data is to be fed to the output/display system 548 may be determined by one or more of the following factors: the speed of the required trick mode operation and whether it is a forward or backward playback, the format of the television signal that the STT 510 is to output, the scan format that the video decoder 523 detects or determines for a picture (or set of pictures), and the scan format used by the compression engine that produced the compressed picture. In this operation mode, the video decoder 523 determines whether the picture has to be displayed in part (i.e., bottom or top field) with a complementary part of another picture. If a picture (or a set of pictures) is determined to be from a progressive scan source, both a top field and a bottom field are output. However, although determined to be a progressive picture, one of the two fields required for output may be from the reconstruction of a first compressed picture while the other field may be from the reconstruction of a second compressed picture. This may be because progressive pictures, such as 24 Hertz film source, often undergo processing that converts the signal into an interlaced scan format by extracting the equivalent lines corresponding to each field from the progressive picture and according to a predetermined procedure (e.g., 3:2 pulldown), repeating a field in two of the consecutive interlaced pictures produced as an interlaced signal.

Figure 6:
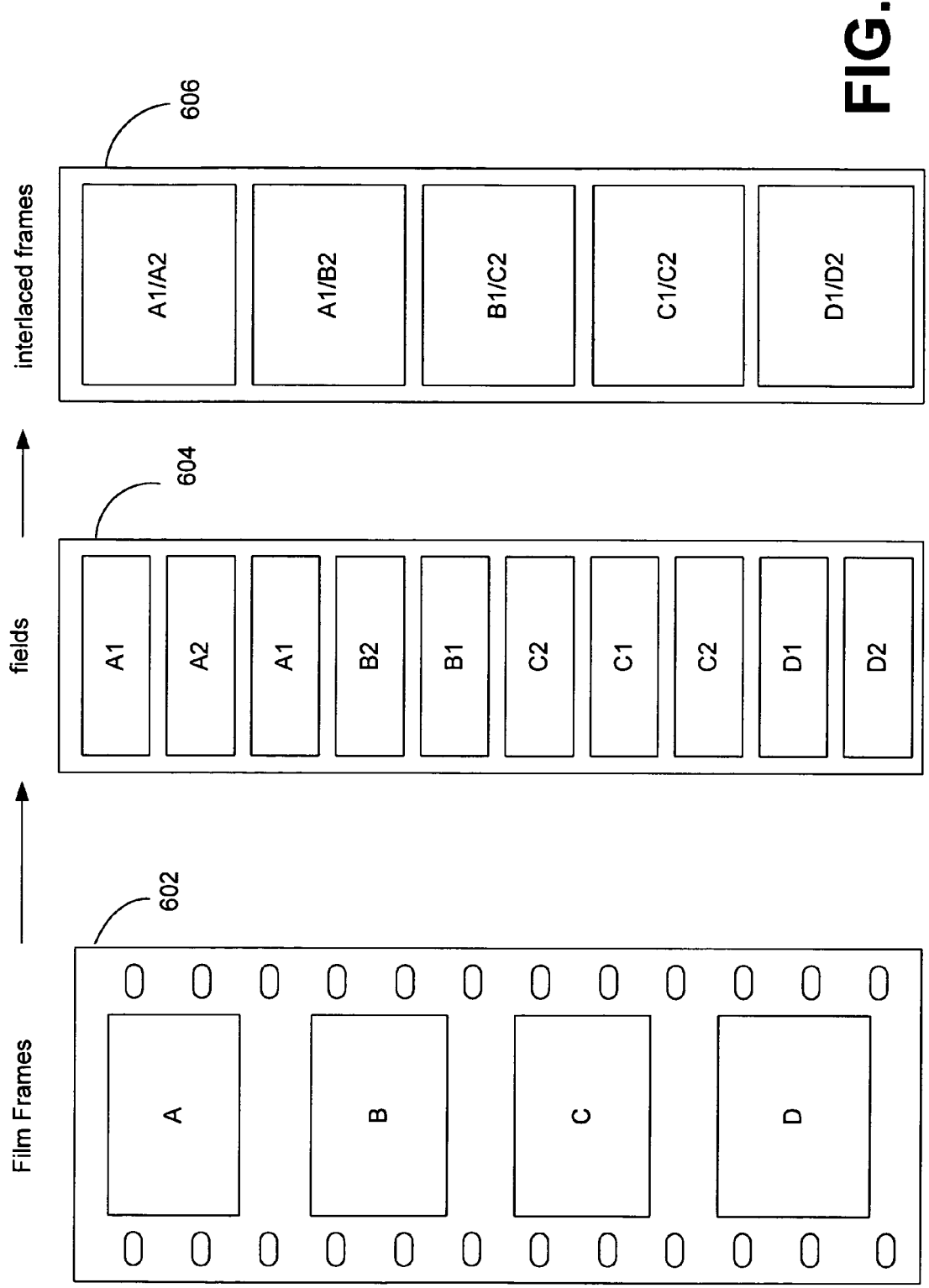
FIG. 6 is a block diagram that illustrates a 3:2 pull-down procedure used in the conversion of film pictures to an National Television Systems Committee (NTSC) interlaced display format during any of the several stages throughout the lifetime of a video sequence at a video decoder in the STT of FIG. 5A, in accordance with one preferred embodiment of the of the disclosure.

With continued reference to FIG. 5A, FIG. 6 is a schematic diagram that is used to illustrate 3:2 pull down, in accordance with one preferred embodiment of the invention. The first block column 602 shows four frames of film, for example, frames A, B, C, and D. The second block column 604 illustrates the pulldown operation of 3 or 2 fields per frame. The third column block 606 shows the interlaced frames created from the fields of column 604 for display on the display device 120 (FIG. 1). The first frame of film, frame A, is placed on 3 fields of video, for example, a repeated field A1 and field A2. The next frame of film, frame B, is placed on 2 fields, for example fields B1 and B2. The next frame of film, frame C, is placed on three fields, for example a repeated field C2, and field C1, and so on.

From these fields shown in second block column 604, the video decoder 523 (FIG. 5A) creates interlaced frames for the display device 120 (FIG. 1), as shown in the third block column 606. The two letters separated by the "/" symbol represents an interlaced frame. For example, "A1/A2" represents that the first frame A (column 602) has been converted to an interlaced frame that is presented first as A1 on a display screen, followed $1/60^{th}$ of a second by A2. The next frame of first block column 602 is frame B, which after 3:2 pulldown, the video decoder 523 presents to the display device 120 as A1, followed $1/60^{th}$ of a second by B2. Following the fields order shown in second column 604, the next presented frame on the display device 120 is B1, followed $1/60^{th}$ of a second by C2, and so on. Thus, for every 4 frames of film, there will be 5 frames of video. Thus, this mapping process "stretches" the 24 frames in a second of film into 30 frames of video made of interlaced pictures, such that they are played back as video in the same elapsed time of 1 second that they would have on film.

Thus, 24 Hz film is converted to 60 Hz interlaced pictures by the process of 3:2 pull-down, shown in FIG. 6, in which the equivalent of the top and bottom field in each of four progressive pictures 602 are used to produce five corresponding interlaced frames 606. However, for any of a number of reasons, one that could be the difficulty of close-caption data association with the proper picture, not every encoder attempts to perform inverse telecine detection, yet the picture remains from an original progressive scan source.

Thus, during trick modes when the video decoder 523 (FIG. 5A) detects or is informed via the scan mode flag (or by the processor 544, FIG. 5A) that the picture was captured or created in progressive scan and the picture was coded as interlaced pictures, to eliminate motion jitter when outputting to an interlaced display device 120 (FIG. 1), both fields of a progressive scan picture are output if the video decoder 523 detects that both fields indeed correspond to the same picture at creation time. For instance, in the case that the compressed (or coded) interlaced picture corresponds to A1/A2, C1/C2 or D1/D2 in 606, and the video decoder ascertains so, either via a scan detection method or from the scan mode flag, both fields of the picture are output. Otherwise two pictures (i.e., an additional picture) are decoded by the video decoder 523 to obtain a respective field from each and composite the progressive picture that was captured at the time of picture creation. This is the case when the first picture decoded is either A1/B2 or B1/C2 in 606. Even when outputting to a progressive display or television, detection of the two corresponding fields of a picture is performed to avoid displaying a picture with respective field equivalent portions that were from two different capture times. Otherwise, a picture displayed repeatedly over multiple consecutive picture display intervals could exhibit discontinuities between alternate lines (since it is composed from two different captured pictures). In this latter case, in which the picture is detected to be of progressive scan and the STT 510 outputs a progressive television signal, motion jitter does not typically manifest but rather discontinuities in the contours of the objects contained in the displayed picture.

Therefore, when performing a trick mode operation, the video decoder 523 determines that a picture or set of pictures is from a progressive source, and it must further ascertain by detection or via the scan mode flag that the fields correspond to the same capture time. The corresponding fields of the progressive picture are then fed to the output/display system 548 as a first field and a second field when the display device accepts an interlaced television signal, or as a progressive picture when the display device accepts a progressive television signal. Such a picture is displayed according to the intended display and output processing as would ordinarily be required during a normal playback mode, except that the same composed picture may be output repeatedly over consecutive picture display intervals.

If a picture (or portions thereof) is determined to be from an interlaced scan source by the video decoder 523 (FIG. 5A), the video decoder 523, running in the operating mode to effect trick modes, in one preferred embodiment invokes a deinterlacer mechanism that employs using the information in one or more fields from past pictures in display order and/or one or more fields from future pictures in display order, to compose the fields of the picture to be output. Thus, the video decoder 523 decodes and reconstructs at least one field from a set of past and future pictures and also decodes both fields of the required picture to be displayed repeatedly over consecutive picture display intervals. From the multiple decoded fields, the video decoder 523, or a deinterlacer (not shown), generates a de-interlaced (or progressive picture approximation) version of the pictures to be output during the trick modes.

Note that in some implementations, an optical scanner can be used to digitize pictures from film. The optical scanning operation typically results in digital pictures created with a progressive scan format, although pictures could be created from film with an interlaced scan format. In one implementation, when the video decoder 523 is effecting a trick mode, if the picture is of a film nature, as the video decoder 523 ascertains by examining the scan mode flag in the picture sequence header over time, and the video decoder 523 further ascertains from the video bitstream that the pictures were compressed as progressive pictures, then the video decoder 523 can assume that both fields in a compressed frame correspond to the same instance of time at the creation time of the corresponding pictures and proceed to display both fields during fast forward, slow forward, rewind, slow backward, or pause operations. The scan mode flag may also be used to assist the video decoder 523 in employing 3:2 pulldown, as shown in FIG. 6, when the video bitstream is coded as progressive pictures, in addition to or in lieu of a repeat field flag that could be provided in a header of the compressed video streams.

Playback Mode Display Strategies

Figure 7:
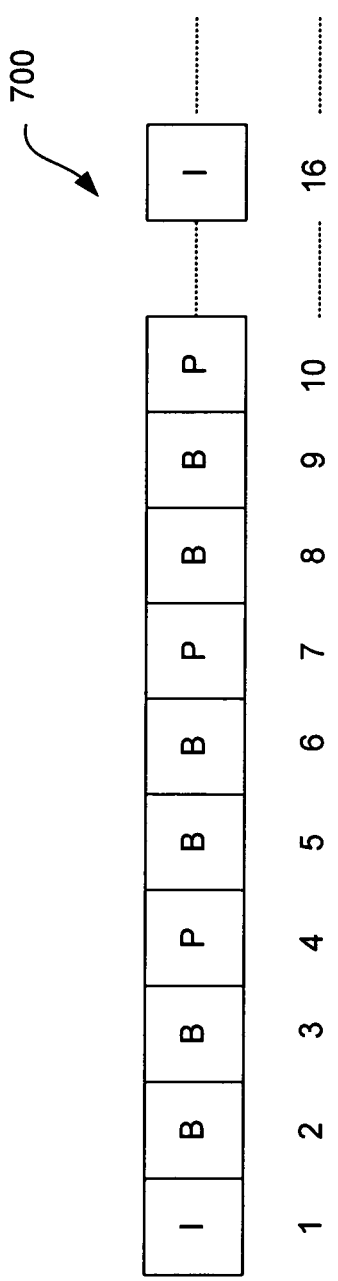
FIG. 7 is a block diagram that illustrates an example comprising various frames in an organization of picture types in display picture order, in accordance with one preferred embodiment of the of the disclosure.

Referring to FIG. 7, assume the picture display order 700 shown, as if for implementing a normal play mode. The picture sequence begins with an I picture at display order 1, followed by two B pictures at display order 2 and 3, a P picture at position 4, two B pictures again at positions 5 and 6, a P picture at position 7, and so forth. If these pictures are to be displayed according to an interlaced scan format in a normal play speed, the top field of the I picture at position 1 is displayed first, and $1/60^{th}$ of a second later, the bottom field of the I picture at position 1 is displayed. Then the top field of the B picture is displayed, followed $1/60^{th}$ of a second later by the bottom field of the B picture, and so forth. This process of displaying the top field and then the bottom field of the pictures repeats itself for as long as normal playback is in effect.

If at the end of a second of time a video sequence would be at the picture located at position 30 (or $30^{th}$ picture) under normal playback mode, for a 3× faster than normal play mode, the picture displayed at the one second of time interval should be the picture at position 90. Or whereas at normal play, the picture position would be at 60 at the end of two seconds of time, at 3× faster than normal play, fast forward, the picture position would be at position 180. The typical goal is to provide a display of pictures such that at the time when the $30^{th}$ and $60^{th}$ pictures would ordinarily be displayed, the 90th and the $180^{th}$ pictures are respectively displayed to effect the sensation of fast forward.

One mechanism to achieve this would be to skip pictures at various intervals, such as presenting the first picture (at position 1), and then the picture at position 4, and so forth. However, for certain speeds of trick modes, the organization of picture types (I, P or B) and the dependencies on referenced pictures through the sequence of pictures in display order causes the need for some pictures to be decoded but not displayed so that they can serve as a reference picture. This imposes a burden on the processing capabilities of the STT 510 and/or video decoder 523. Consequently, another mechanism would be to display certain pictures repeatedly over multiple consecutive picture display intervals to alleviate the processing burden in STT 510 and/or video decoder 523. For example, for the 3× times faster than normal playback operation, assume the picture organization 700 depicted in FIG. 7. Rather than decoding and displaying every P picture in the sequence, the I pictures only could be retrieved from the storage device 573 (FIG. 5A) (or transmitted from the VOD server 222, FIG. 2), decoded by video decoder 523 but displayed repeatedly over five consecutive picture display intervals. Whereas the first method of 3× faster playback implementation would have decoded every I and every interspersed P picture and thus require a total of six I pictures and 24 P pictures displayed over one second, a Method A (described below) only requires the six I pictures to be decoded but each displayed repeatedly over five consecutive picture display intervals. Note that each I picture is displayed for five picture display intervals because it replaces four P pictures (and its prior display instance sums to five). The fast forward sensation is the same to the viewer but demands less computation and processing from the STT 510 and by the video decoder 523. For a 6× times faster than normal playback mode, the first method would require that every other P picture be displayed, assuming picture organization 700. However, in order to decode a P picture, other P pictures not required to be displayed would have to be decoded to serve as a reference picture to the P picture that is required to be output. Consequently, the method of decoding and displaying I pictures only while repeatedly outputting the I picture over consecutive picture display intervals can save considerable processing and computation. Since for 6× speed the $180^{th}$ picture must be displayed at the end of the first second of time, assuming the picture organization 700 of FIG. 7, only 12 I pictures would be decoded, some output over two consecutive picture display intervals.

There are several mechanisms and/or strategies for providing a display during trick playback mode operations. As previously described, multiple factors and the processing and computing capabilities of STT 510 may determine whether a picture may have to be displayed repeatedly over consecutive picture display intervals. Table 1 below summarizes the processing implemented to support trick mode operations that display all lines of a picture (i.e., two fields from lines from two different fields) that is displayed over consecutive picture display intervals, independent of playback speed and direction. Table 1 assumes that a picture is displayed repeatedly over consecutive display intervals. The factors listed are a picture's native scan format, the scan format employed in encoding the picture and the television type. The type of processing to avoid the respective artifact is conveyed in the right-most column.

The "Source" heading signifies the scan format at the time the picture was created—the native scan format. In other words, it signifies the scan format at the time that the picture was captured and formed into media or a camera sensor from light. A scan mode flag with an affirmative progressive scan value indicates that the picture was optically scanned as a progressive picture or that the picture initially was from a progressive scan source. Equivalently, a "progressive scan format" flag or a film mode flag could have part of the functional purpose as the scan mode flag as it conveys the progressive (P) or interlaced scan format (I). However, in this disclosure, the scan mode flag carries specific information as a result of the detection method described above and/or is different as explained above in that it can have a progressive affirmative value yet the picture (or set of pictures) can be coded as interlaced pictures. Reference to a film flag throughout this disclosure should be interpreted as the source scan mode flag.

The "Coded" heading in Table 1 signifies the manner in which the picture was encoded by a compression engine (e.g., encoder 206), either as a progressive picture (frame) or as two fields (fields). "Television Type" signifies the scan format of the television driven by the STT 510, either an interlaced scan TV (I) or a progressive scan TV (P).

As Table 1 indicates, the manner on how interlaced pictures are coded is irrelevant (as indicated by don't care). Likewise, the television type is irrelevant when the picture is a progressive picture and it is encoded as progressive.

TABLE 1

| | Source | Coded | Effect of how picture is Coded | Television Type | Effect of Television Type | Requires Processing? | Type of Processing Required and Artifact Avoided |
|---|---|---|---|---|---|---|---|
| 1 | I | I (fields) | Don't care | I | Yes | Yes | Must de-interlace to avoid motion jitter |
| 2 | I | frame | Don't care | I | Yes | Yes | Must de-interlace to avoid motion jitter |
| 3 | I | I (fields) | Don't care | P | Yes | Yes | Must de-interlace to avoid displaying discontinuities in objects' contours |
| 4 | I | frame | Don't care | P | Yes | Yes | Must de-interlace to avoid displaying discontinuities in objects' contours |
| 5 | P | I (fields) or non-film frame rate | Yes | P | Yes | Yes | Detect fields from the same picture in a single picture or two consecutive pictures. Alternative is to de-interlace |

TABLE 1-continued

| | Source | Coded | Effect of how picture is Coded | Television Type | Effect of Television Type | Requires Processing? | Type of Processing Required and Artifact Avoided |
|---|---|---|---|---|---|---|---|
| 6 | P | I (fields) or non-film frame rate | Yes | I | Yes | Yes | Detect fields from the same picture in a single picture or two consecutive pictures. Alternative is to de-interlace |
| 7 | P | P (original frame rate at capture) | Yes | P | Don't care | No | Display decoded picture as is; no artifact |
| 8 | P | P (original frame rate at capture) | Yes | I | Don't care | No | Display decoded picture as is; no artifact |

Case where Only I Pictures are Decoded and Display for Trick Modes (Method A)

As shown for cases 1 to 4 in Table 1, to prevent motion jitter, each I picture from an interlaced scan source is deinterlaced prior to outputting. The deinterlacing procedure can merely employ the information in both fields and be assisted by the scan mode detection procedure (e.g., based on vertical profile analysis) described previously to adjust the edges from line to line in conjunction with limited low pass filtering. Alternatively, the deinterlacing procedure uses the information of at least one extra picture that is also required to be output. Alternatively, one or more pictures not required to be output can be decoded for deinterlacing purposes only, depending on the processing capabilities of STT 510 (FIG. 5A). In a STT 510 with limited processing capabilities, a field of at least one P picture, preferably (but not necessarily) the subsequent P picture to the I picture (in the picture display order) is employed for deinterlacing. However, fields from one or both closest pictures to the I picture in the picture display order, irrespective of their picture type, can be employed if the compute and processing capabilities of the STT 510 and video decoder 523 (FIG. 5A) allow so.

For cases 5 and 6 of Table 1, in which the picture indicates to be from a progressive scan source, the scan format detection method is performed in the decoded I picture. Upon determining that the picture contains fields corresponding to two different progressive pictures, the subsequent picture in display order is decoded to obtain the corresponding field. Alternatively, deinterlacing can be performed as described above for an I picture from an interlaced scan source.

In some cases in which the STT 510 and video decoder 523 are limited in compute and processing capabilities, certain I pictures that would ordinarily be decoded and displayed are not and the savings in computation and processing allow for other pictures to be decoded and used as input to the deinterlacing procedure or to reconstruct a proper progressive picture.

Case where Pictures Other than I are Decoded in Addition to I Pictures and Displayed for Trick Modes (Method B)

In this case, the STT 510 (FIG. 5A) and video decoder 523 (FIG. 5A) likely have ample compute and processing capabilities. When deinterlacing is required to be performed to reconstruct a deinterlaced version of a picture, the closest picture to a picture in display order is decoded to obtain the required fields for input to the deinterlacing procedure. Likewise, when the adjacent picture is required to be decoded for cases 5 and 6 of Table 1 to properly reconstruct a progressive picture, the adjacent picture is decoded and the proper progressive picture composed from fields of the two decoded pictures.

For both methods of implementing trick modes (Methods A and B), when pause and slow motion playback are effected, regardless of the computation and processing capabilities of the STT 510 (FIG. 5A) and video decoder 523 (FIG. 5A), the deinterlacing procedure and progressive picture composition are implemented without any (or without any significant) compromise since the slow playback provides ample time for decoding of all the extra necessary pictures required to obtain a high quality picture without artifacts. Consequently, in one preferred embodiment, both fields of a picture are always displayed for pause and slow speed trick modes but for fast speed trick modes only one field of the picture is displayed by displaying it twice or by first scaling it to the size of the complete picture (i.e., two fields size) with the upscaling capabilities in the display/output system 548.

The video decoder 523 (FIG. 5A), compression engine 517 (FIG. 5A), and the encoder 206 (FIG. 2) can be implemented in hardware, software, firmware, or a combination thereof. In the preferred embodiment(s), the video decoder 523, compression engine 517, and the encoder 206 are each implemented in a digital signal processor or media processor device. Alternatively, software and firmware that is stored in a memory and that is executed by a suitable instruction execution system is employed to effect the decoding operations. If implemented in hardware, as in an alternative embodiment, the video decoder 523, compression engine 517, and the encoder 206 may each be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The video decoder 523, compression engine 517, and the encoder 206, which each can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM)

(electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It should be emphasized that the above-described embodiments, particularly, any "preferred embodiments" are merely possible examples of implementations, merely setting forth a clear understanding of the principles of the disclosure. Many variations and modifications may be made to the above-described embodiments without departing substantially from the spirit of the disclosed principles. All such modifications and variations are intended to be included herein within the scope of the disclosure and protected by the following claims.

Therefore, having thus described the invention, at least the following is claimed:

1. A method for displaying pictures of a compressed video stream during playback mode operations corresponding to trick modes, said method comprising:
   receiving a compressed video stream that includes plural pictures encoded according to a first scan format;
   detecting a scan mode indicator in the compressed video stream, wherein the scan mode indicator indicates that a second scan format was used during the creation of the plural pictures, the first scan format different than the second scan format, the scan mode indicator further indicating a specific sequence of the plural pictures to which the scan mode indicator applies, wherein if the scan mode indicator indicates a film format, examining a plurality of scan mode flags in the compressed video stream over time to determine the scan format used during compression, and wherein the scan mode flag is provided in the compressed video in a separate file by itself; and
   responsive to a trick mode request and to a determination based on the scan mode indicator that the second scan format was used in the creation, displaying two fields of each respective decoded picture that corresponds to a subset of the plural pictures, the subset involved in fulfilling the trick mode request, each of the fields of the each respective decoded picture displayed during a respective picture display interval.

2. The method of claim 1, wherein displaying the two fields comprises displaying both interlaced field frames during a first and second respective picture display interval if the scan mode indicator indicates that a progressive scan format was used during the creation of the plural pictures.

3. The method of claim 1, wherein the scan mode indicator includes a flag in at least one of a picture header and a picture sequence header.

4. A method for displaying pictures of a compressed video stream during playback mode operations corresponding to trick modes, said method comprising:
   receiving a compressed video stream that includes plural pictures encoded by an encoder according to a first scan format; and
   detecting a scan mode flag in the compressed video stream, wherein the scan mode flag indicates a scan format used in the creation of the plural pictures that are inputted to the encoder, the scan mode flag conveying the scan format of the created plural pictures independent of the scan format used by the encoder, the scan mode flag further conveying an affirmative progressive value and the scan format used during compression, wherein if the scan mode flag indicates a film format, examining a plurality of scan mode flags in the compressed video stream over time to determine the scan format used during compression, and wherein the scan mode flag is provided in the compressed video in a separate file by itself.

5. The method of claim 4, wherein the scan mode flag is included in at least one of a picture header and a picture sequence header.

6. The method of claim of claim 4, further comprising responsive to a trick mode request, decoding a subset of the plural pictures, the subset including first and second picture types, the subset involved in fulfilling the trick mode request.

7. The method of claim of claim 6, further comprising responsive to the trick mode request, providing for display two fields of each respective decoded picture of the subset used to fulfill the trick mode request, the subset including first and second picture types, each of the fields of the each respective decoded picture displayed during a respective picture display interval.

8. A method for displaying pictures of a compressed video stream during playback mode operations corresponding to trick modes, said method comprising:
   receiving a compressed video stream that includes plural pictures formatted according to first scan format;
   detecting a scan mode indicator in the compressed video stream, wherein the scan mode indicator indicates whether the first scan format or a second scan format different than the first scan format was used during the creation of the plural pictures, wherein the scan mode indicator includes a flag in a picture sequence header, the scan mode indicator further indicating a specific sequence of the plural pictures to which the scan mode indicator applies, wherein if the scan mode indicator indicates a film format, examining a plurality of scan mode flags in the compressed video stream over time to determine the scan format used during compression, and wherein the scan mode flag is provided in the compressed video in a separate file by itself;
   responsive to a trick mode request, decoding a subset of the plural pictures; and
   outputting for display in respective picture intervals both fields of each picture of a portion of the subset used to fulfill the trick mode based on the scan mode indicator, the portion including plural picture types and comprising the first scan format.

9. A video decompression system, comprising:
   a memory with logic; and
   a processor configured with the logic to receive a compressed video stream that includes plural pictures encoded according to a first scan format and detect a scan mode indicator in the compressed video stream, wherein the scan mode indicator indicates that a second scan format was used during the creation of the plural pictures, the scan mode indicator further indicating a specific sequence of the plural pictures to which the scan mode indicator applies, wherein if the scan mode indicator indicates a film format, examining a plurality of scan mode flags in the compressed video stream over time to determine the scan format used during compression, and wherein the scan mode flag is provided in the compressed video in a separate file by itself, and responsive to a trick mode request and to a determination based on the scan mode indicator that the second scan format was used in the creation, output for display two fields of each respective decoded picture that corresponds to a subset of the plural pictures, the subset involved in fulfilling the trick mode request, each of the fields of the each respective decoded picture displayed during a respective picture display interval.

10. The system of claim 9, wherein the processor is further configured with the logic to output for display both interlaced field frames during a first and second respective picture display interval if the scan mode indicator indicates that a progressive scan format was used during the creation of the plural pictures.

11. The system of claim 9, wherein the scan mode indicator includes a flag in at least one of a picture header and a picture sequence header.

12. A video decompression system, comprising:
a memory with logic; and
a processor configured with the logic to receive a compressed video stream that includes plural pictures encoded by an encoder according to a first scan format, wherein the processor is further configured with the logic to detect a scan mode flag in the compressed video stream, wherein the scan mode flag indicates a scan format used in the creation of the plural pictures that are inputted to the encoder, the scan mode flag conveying the scan format of the created plural pictures independent of the scan format used by the encoder, the scan mode flag further conveying an affirmative progressive value and the scan format used during compression, wherein if the scan mode flag indicates a film format, examining a plurality of scan mode flags in the compressed video stream over time to determine the scan format used during compression, and wherein the scan mode flag is provided in the compressed video in a separate file by itself.

13. The system of claim 12, wherein the scan mode flag is included in at least one of a picture header and a picture sequence header.

14. The system of claim of claim 12, further comprising a decoder, wherein the processor is further configured with the logic to, responsive to a trick mode request, effect decoding by the decoder a subset of the plural pictures, the subset including first and second picture types, the subset involved in fulfilling the trick mode request.

15. The system of claim of claim 14, wherein the processor is further configured with the logic to, responsive to a trick mode request, output for display two fields of each respective decoded picture of the subset used to fulfill the trick mode request, the subset including first and second picture types, each of the fields of the each respective decoded picture displayed during a respective picture display interval.

16. A video decompression system, comprising:
a memory with logic;
a decoder; and
a processor configured with the logic to receive a compressed video stream that includes plural pictures formatted according to first scan format, wherein the processor is further configured with the logic to detect a scan mode indicator in the compressed video stream, wherein the scan mode indicator indicates whether the first scan format or a second scan format different than the first scan format was used during the creation of the plural pictures, wherein the scan mode indicator includes a flag in a picture header, the scan mode indicator further indicating a specific sequence of the plural pictures to which the scan mode indicator applies, wherein if the scan mode indicator indicates a film format, examining a plurality of scan mode flags in the compressed video stream over time to determine the scan format used during compression, and wherein the scan mode flag is provided in the compressed video in a separate file by itself,
wherein responsive to a trick mode request, the processor is further configured with the logic to effect decoding by the decoder of a subset of the plural pictures, and
wherein the processor is further configured with the logic to output for display in respective picture intervals both fields of each picture of a portion of the subset used to fulfill the trick mode based on the scan mode indicator, the portion including plural picture types and comprising the first scan format.

17. A method for providing a compressed video stream, comprising:
receiving at a video encoder at least one picture captured by an image capture device, the picture captured according to a first scan format;
encoding said picture at the video encoder to form a compressed video stream according to a second scan format; and
inserting a scan mode flag into said compressed video stream, said scan mode flag indicating said first scan format, said first scan format different than the second scan format, the scan mode flag further conveying an affirmative progressive value and the scan format used during compression, wherein if the scan mode flag indicates a film format, examining a plurality of scan mode flags in the compressed video stream over time to determine the scan format used during compression, and wherein the scan mode flag is provided in the compressed video in a separate file by itself.

18. The method of claim 17, further comprising transmitting said video stream to at least one set-top terminal (STT).

19. The method of claim 17, further comprising detecting said first scan format at said video encoder.

20. The method of claim 17, wherein inserting the scan mode flag into said video stream comprises inserting said scan mode flag into a picture sequence header.

21. An apparatus for providing a video stream, comprising:
a memory with logic;
a processor configured with logic to:
receive at least one picture captured by an image capture device, the picture captured according to a first scan format;
encode said picture to form a compressed video stream according to a second scan format; and
insert into said compressed video stream a scan mode flag that indicates said first scan format, said first scan format different than the second scan format, the scan mode flag further conveying an affirmative progressive value and the scan format used during compression, wherein if the scan mode flag indicates a film format, examining a plurality of scan mode flags in the compressed video stream over time to determine the scan format used during compression, and wherein the scan mode flag is provided in the compressed video in a separate file by itself.

22. The apparatus of claim 21, wherein said processor is further configured with logic to determine said first scan format.

* * * * *